Aug. 24, 1943.    C. E. WYRICK    2,327,689
COLLATING MACHINE
Filed Oct. 21, 1940    14 Sheets-Sheet 3

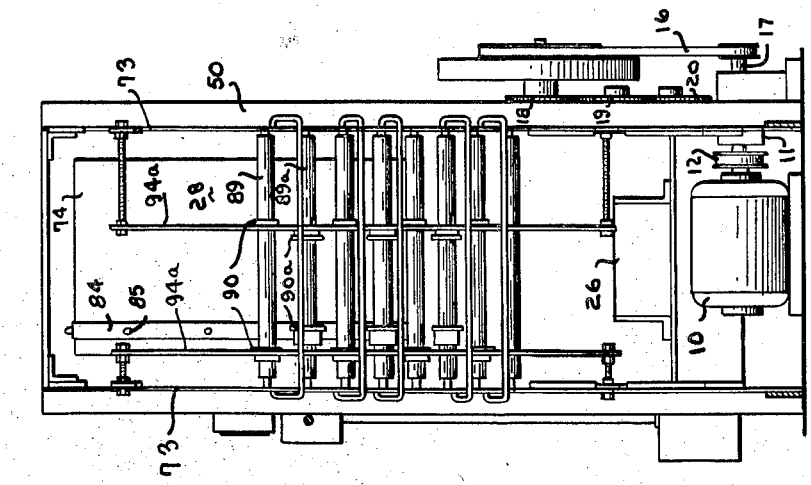

INVENTOR
CLAYTON E. WYRICK
BY Toulmin & Toulmin
ATTORNEYS

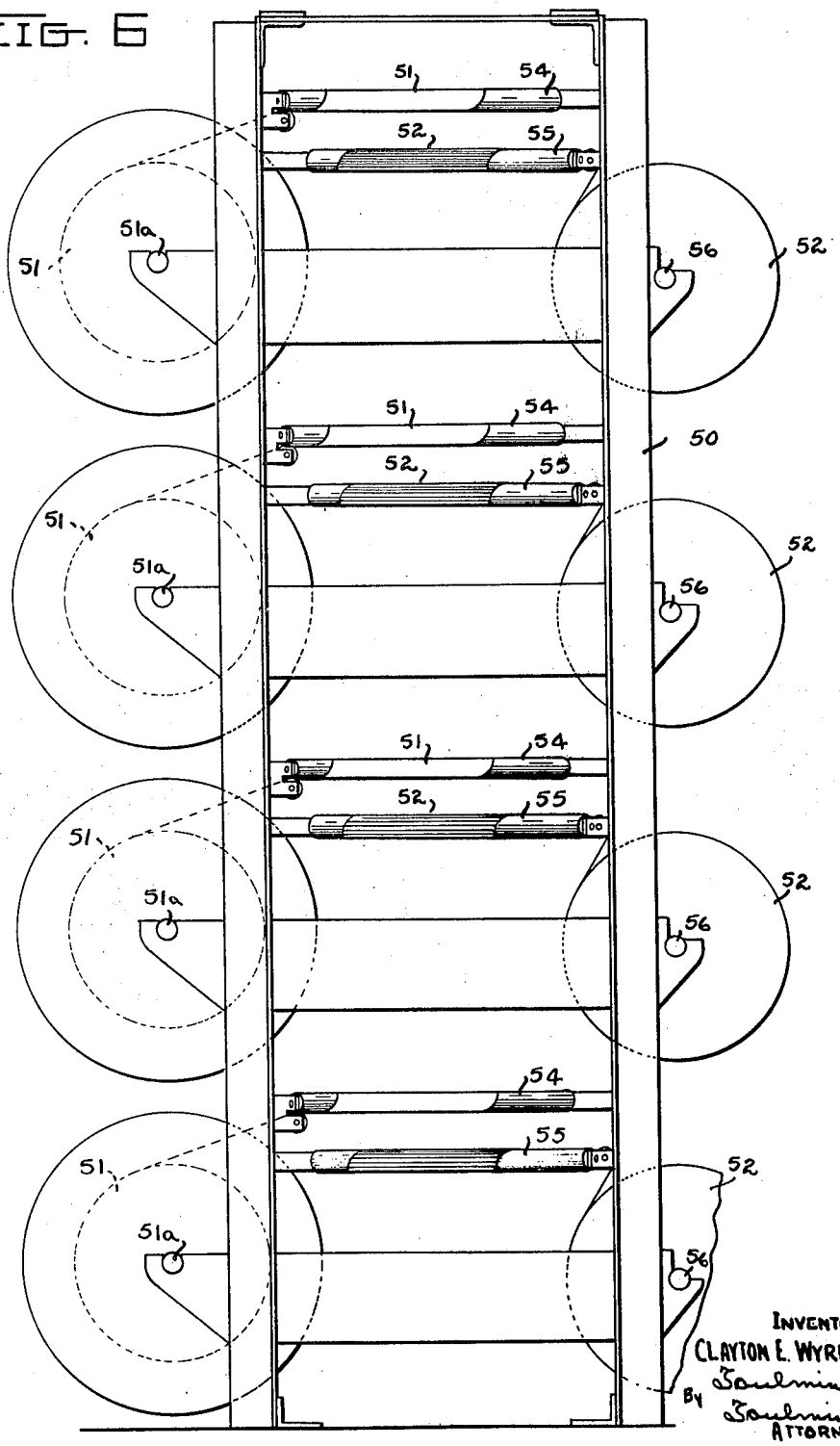

Aug. 24, 1943.     C. E. WYRICK     2,327,689
COLLATING MACHINE
Filed Oct. 21, 1940     14 Sheets-Sheet 5
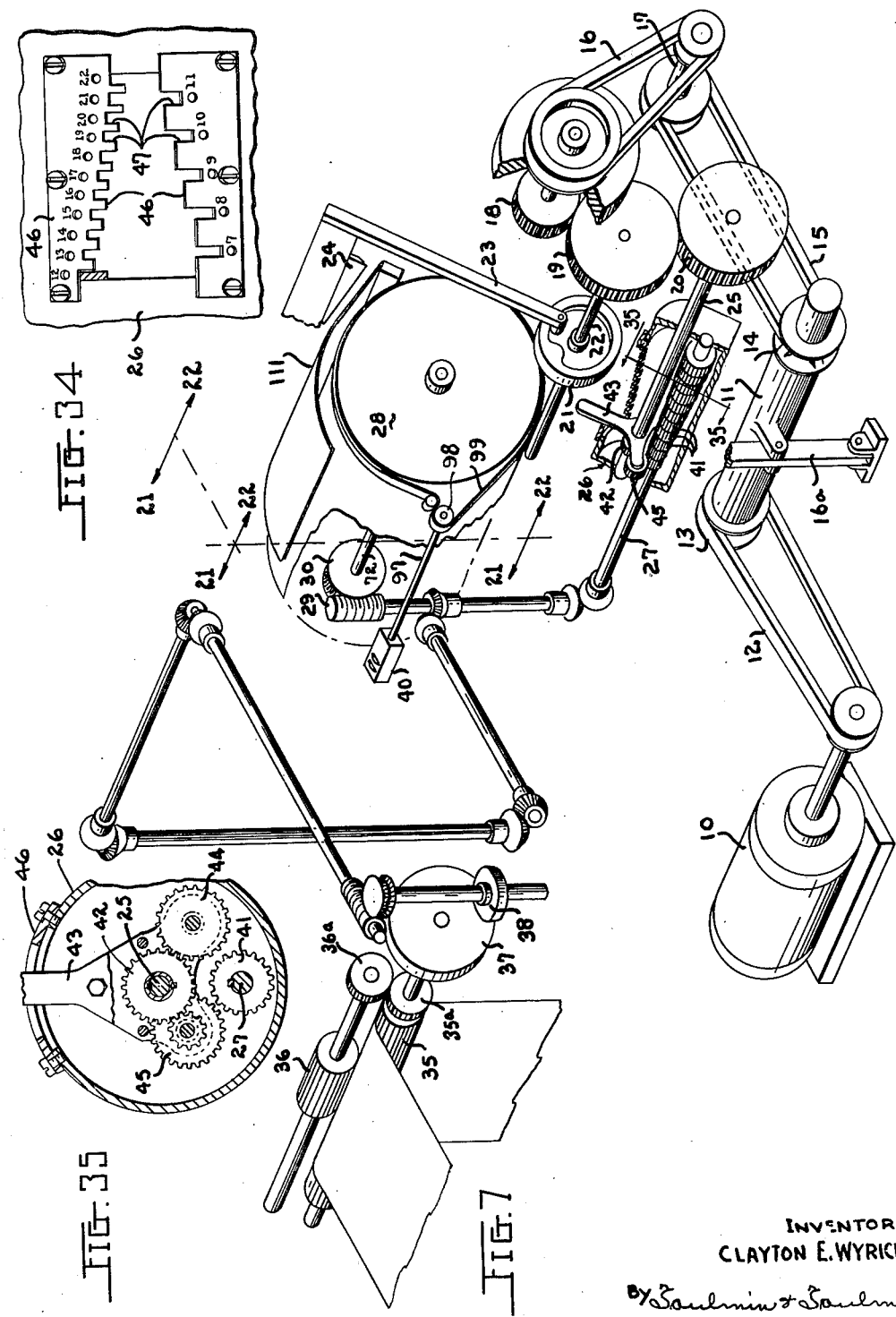
INVENTOR
CLAYTON E. WYRICK
BY Toulmin & Toulmin
ATTORNEYS

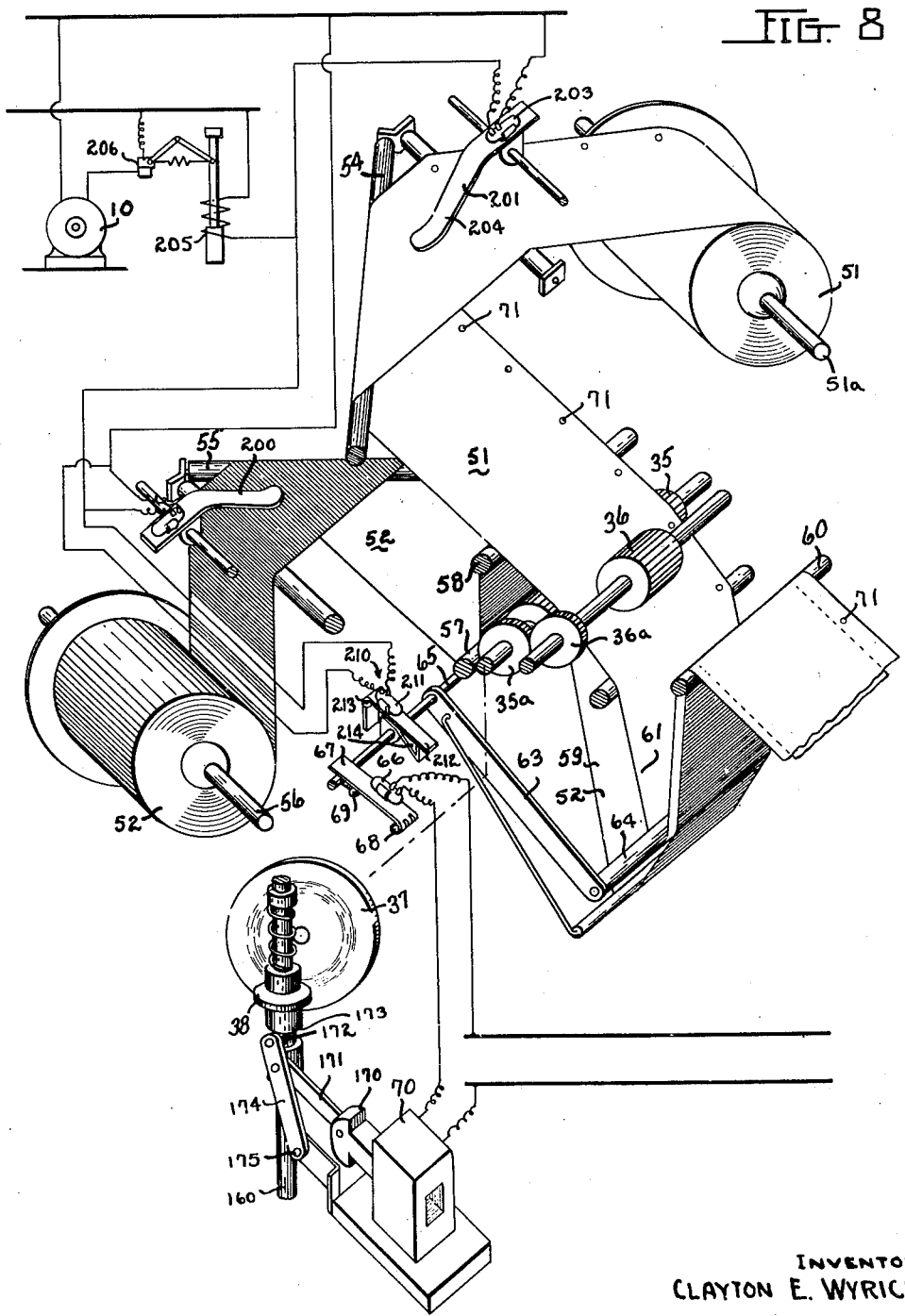

Aug. 24, 1943.  C. E. WYRICK  2,327,689
COLLATING MACHINE
Filed Oct. 21, 1940  14 Sheets-Sheet 7
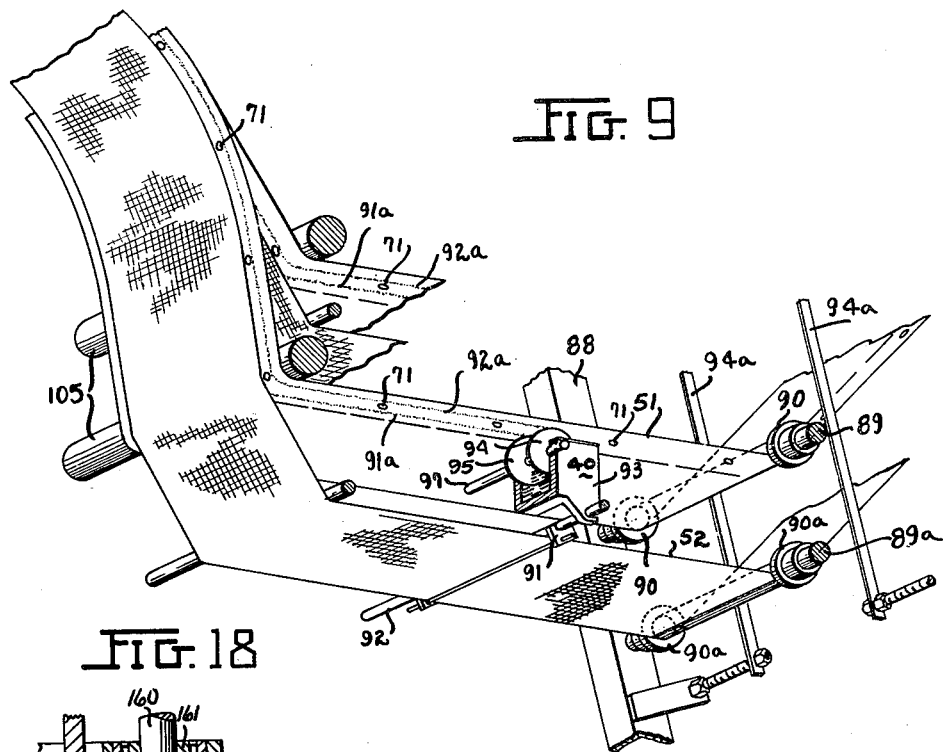
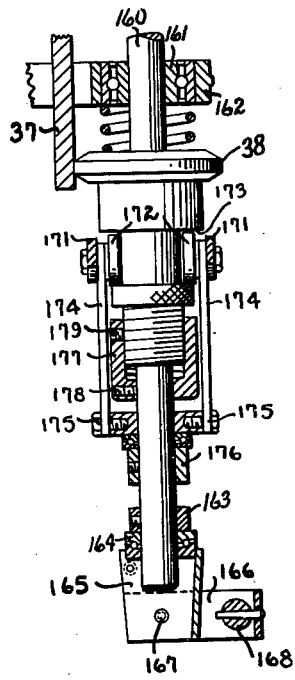
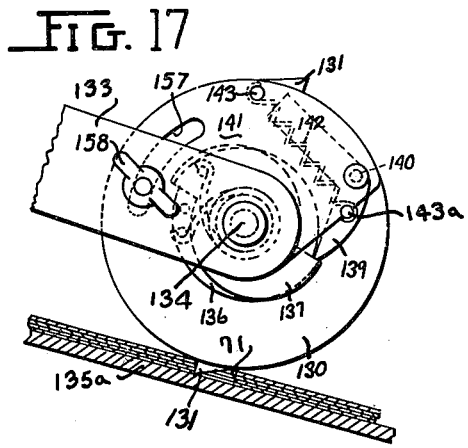
INVENTOR
CLAYTON E. WYRICK
BY Toulmin & Toulmin
ATTORNEYS

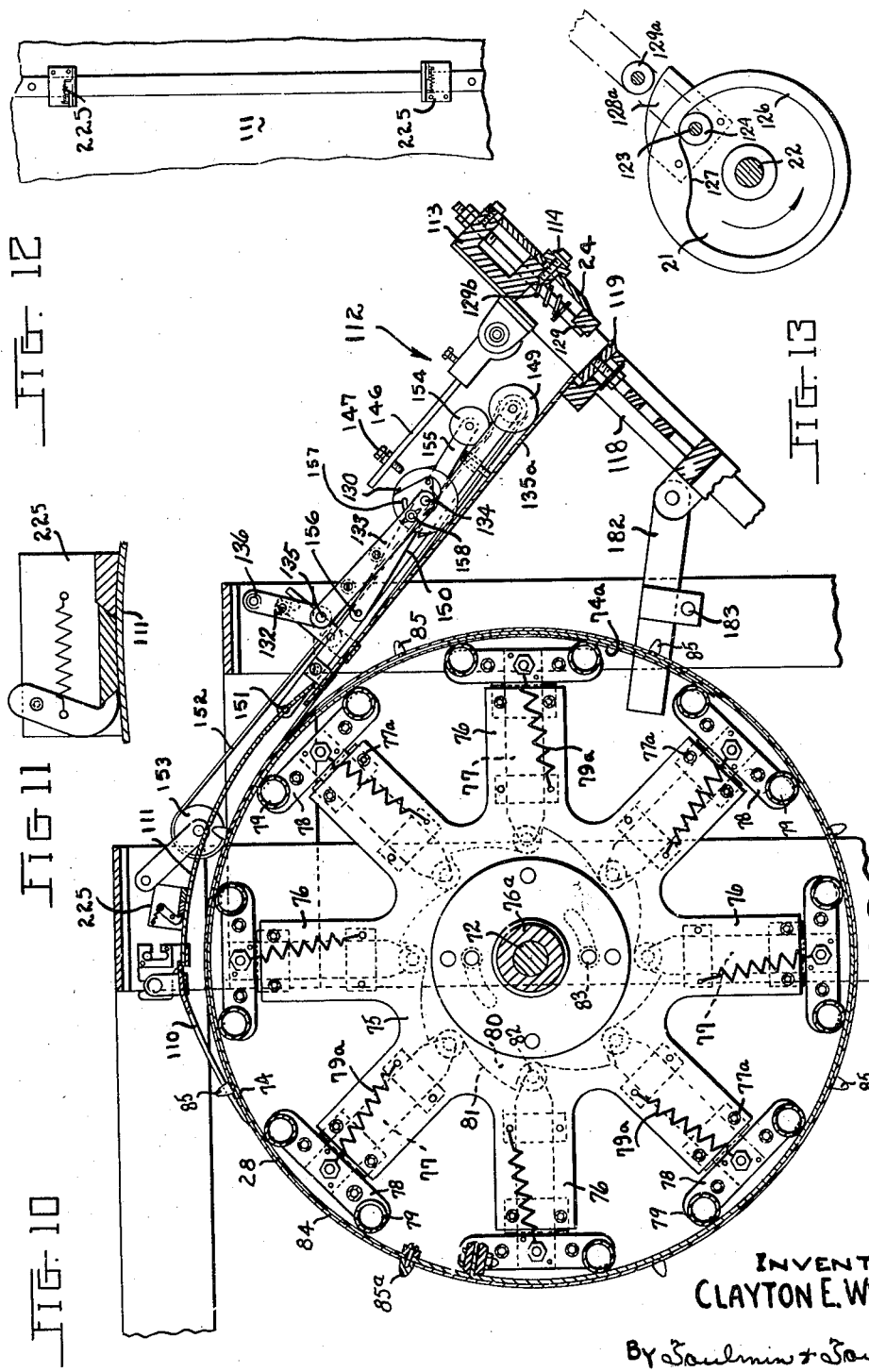

Aug. 24, 1943.  C. E. WYRICK  2,327,689
COLLATING MACHINE
Filed Oct. 21, 1940  14 Sheets-Sheet 9
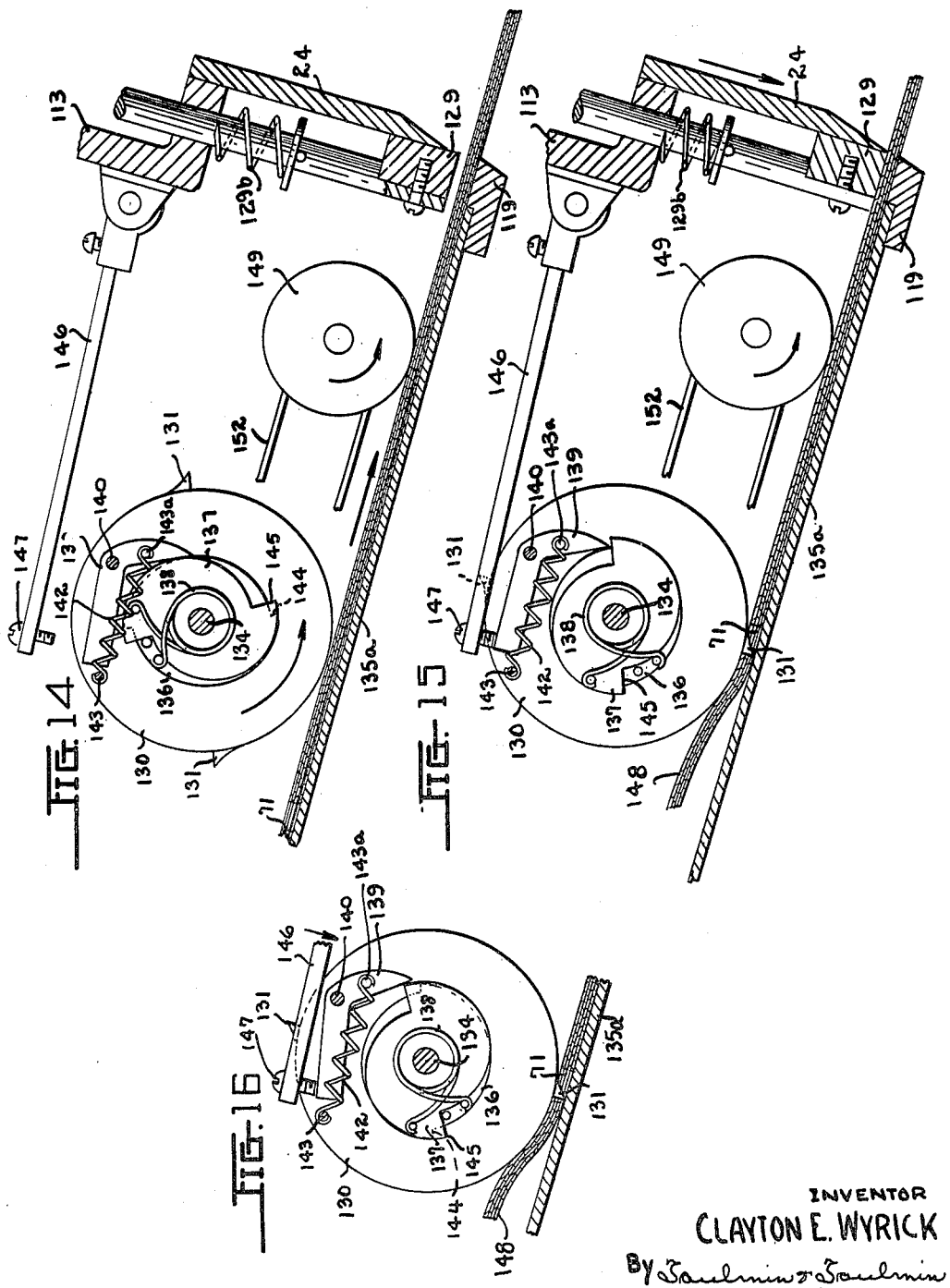
INVENTOR
CLAYTON E. WYRICK
By Toulmin & Toulmin
ATTORNEYS

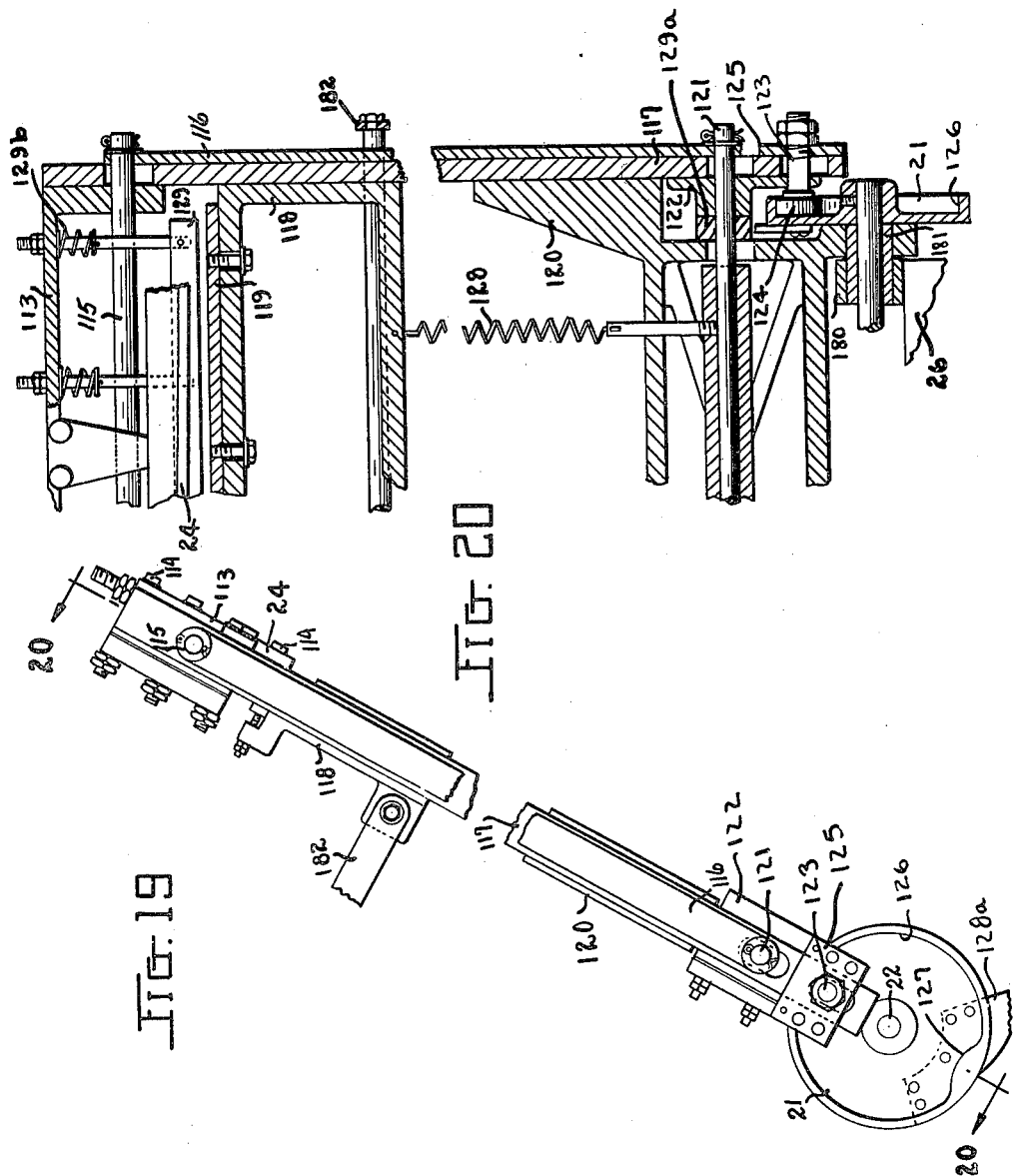

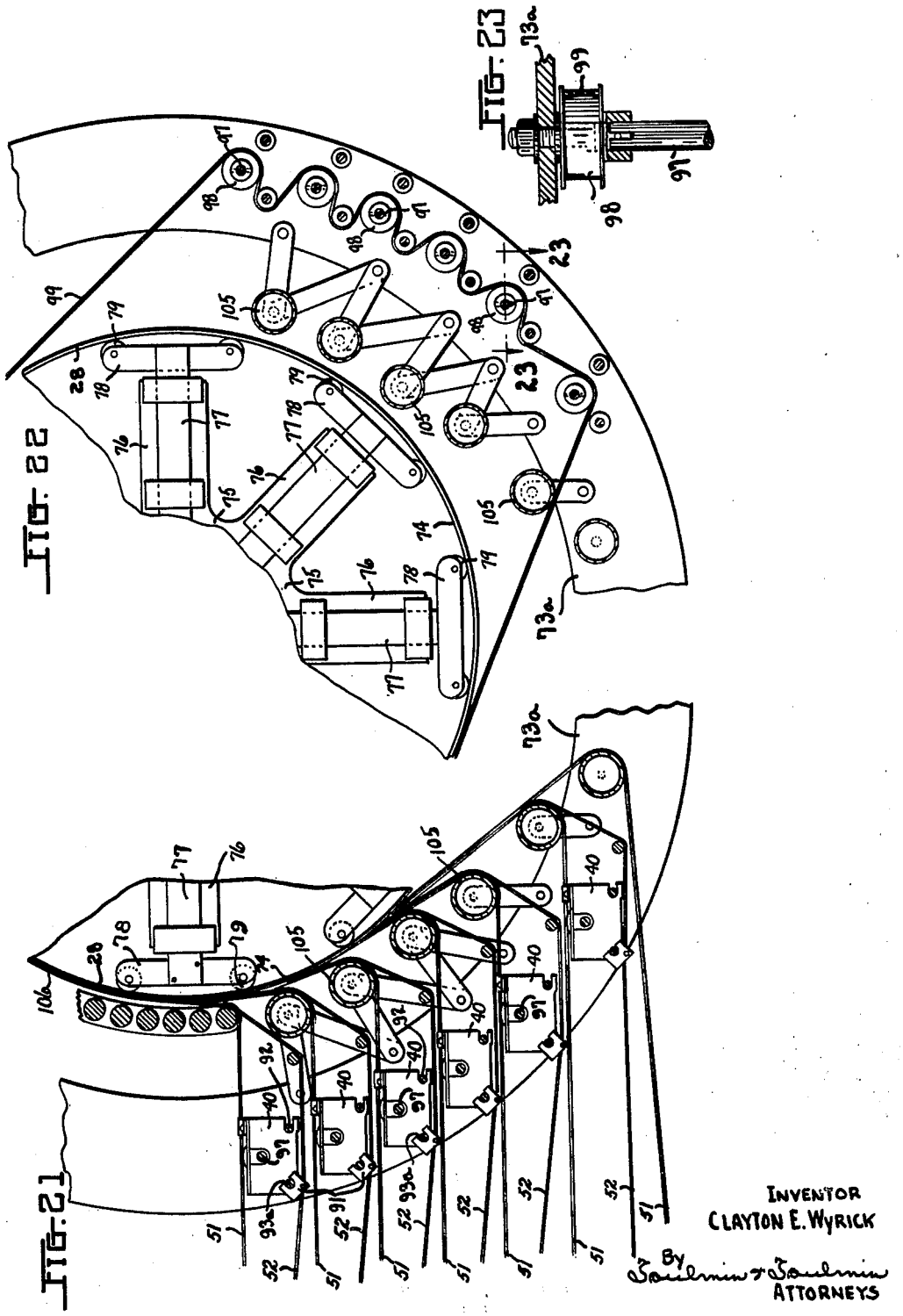

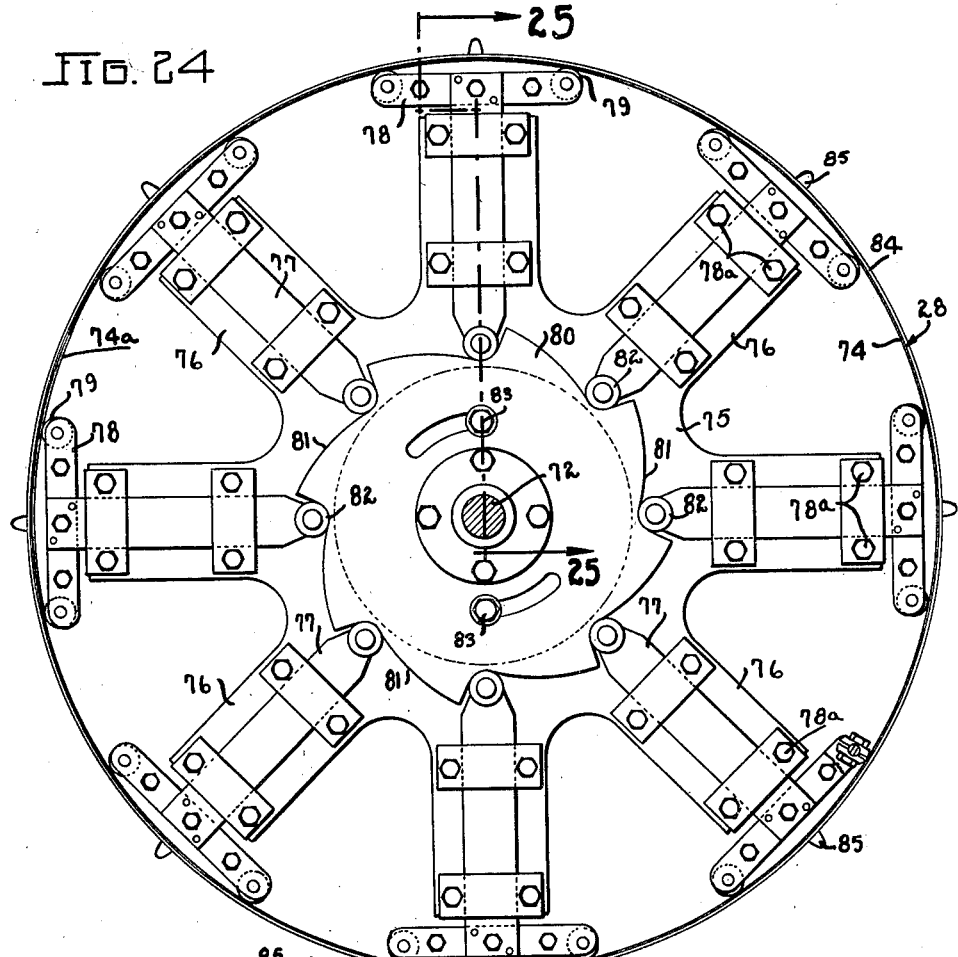
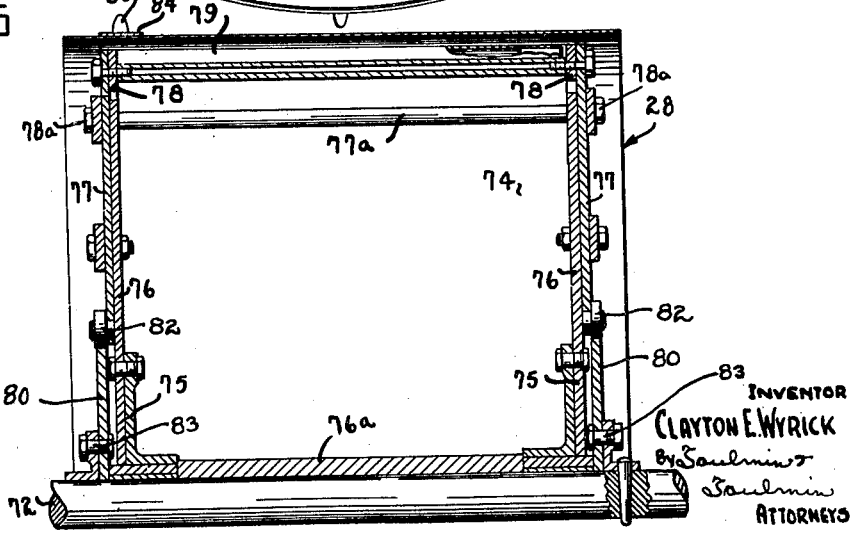

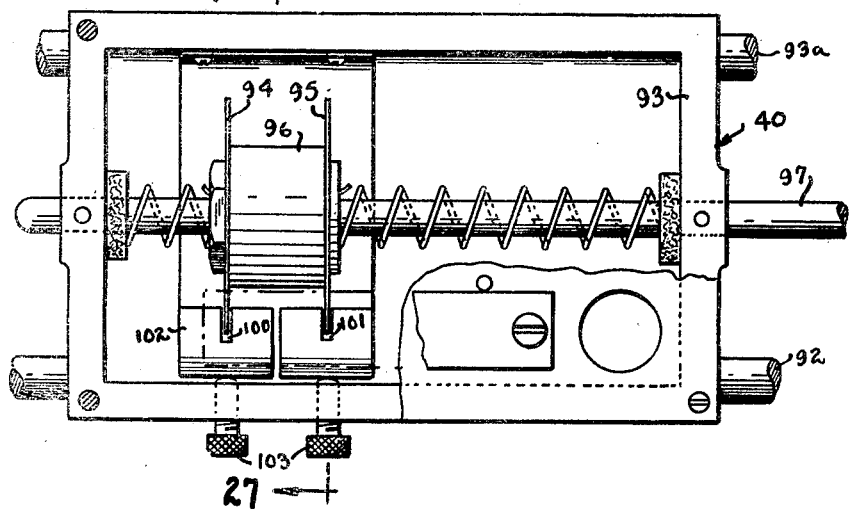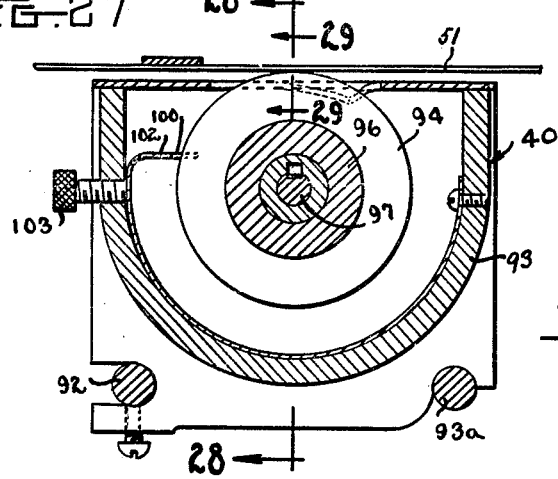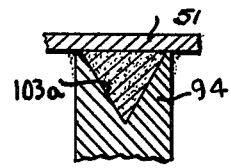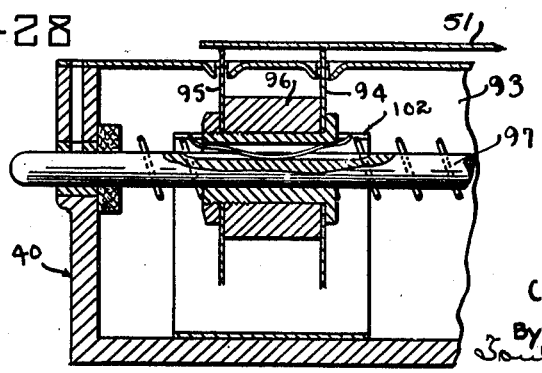

Aug. 24, 1943.   C. E. WYRICK   2,327,689
COLLATING MACHINE
Filed Oct. 21, 1940   14 Sheets-Sheet 14

INVENTOR
CLAYTON E. WYRICK
ATTORNEYS

Patented Aug. 24, 1943

2,327,689

UNITED STATES PATENT OFFICE 2,327,689

COLLATING MACHINE

Clayton E. Wyrick, Dayton, Ohio, assignor to The Egry Register Company, Dayton, Ohio, a corporation of Ohio Application October 21, 1940, Serial No. 362,006

32 Claims. (Cl. 270—52)

This invention relates to an apparatus for collating and interleaving a plurality of paper and carbon webs in a manner that successive or adjacent paper webs will be aligned both transversely and longitudinally, so that printed forms appearing upon the paper webs will be arranged in proper register for making a plurality of copies of an original sheet. The apparatus is also arranged to glue, or cause adherence, between adjacent paper webs and the interleaved carbon webs to provide a book arrangement of the plurality of sheets comprising the desired number of copies.

An object of the invention is to provide a continuously operating machine which will accurately align interleaved carbon and paper webs in a manner that the carbon webs are positioned a marginal distance from the edges of the paper webs and are retained in this marginal position while the successive webs are caused to be adhered together.

It is another object of the invention to provide a machine upon which a plurality of paper webs, which have printed faces thereon, can be interleaved with a plurality of carbon webs, wherein the machine can be adjusted to permit interleaving and collating of any desired size of printed form, and can be arranged to separate successive printed forms upon the webs regardless of the width or length of the form.

A further object of the invention is to provide a machine for handling a paper web wherein the machine can be adjusted to vary the linear speed of the web passing through the machine to permit a varying width cut-off sheet, and be separated from the web by the cut-off means of the machine which operates at a constant speed regardless of the web speed through the machine.

Another object of the invention is to provide a collating machine wherein the alignment of a plurality of paper and carbon webs is initiated at the feeding mechanism for each of the webs, and wherein the rough alignment is more accurately determined to provide a margin between the edges of the carbon and paper webs while applying adhesive to the paper webs for securing the plurality of webs together.

Another object of the invention is to provide a machine for handling one or more paper webs and through which the webs are fed continuously, and wherein means are provided for intermittently stopping the movement of the end of the web or web stack discharging from the machine to permit the cut-off attachment to remove a predetermined length of the web stack.

A still further object of the invention is to provide a collating and interleaving machine for a plurality of paper and carbon webs wherein a continuous line of adhesive is applied to the under side of each of the paper webs, whereby the carbon webs are caused to adhere to the paper webs and the paper webs to each other, and to provide means for accurately aligning the carbon web upon the paper web to permit a predetermined margin along both edges of the paper web which is free of carbon.

A still further object of the invention is to provide a collating and interleaving machine wherein a carbon web is accurately aligned with a paper web to provide a determined margin between the edges thereof and to accomplish the alignment while in spaced relation and, while so aligning the webs, of applying adhesive to the paper web and thereafter bringing the carbon web and the paper web together in their prealigned condition to cause adherence therebetween in their aligned relation.

A still further object of the invention is to provide an improved means for applying adhesive to the paper webs to permit the use of a continuous line of adhesive without causing wrinkling of the webs after the adhesive has dried.

A still further object of the invention is to control the quantity of adhesive which can be applied upon the webs to prevent excess of adhesive and to provide a continuous line thereof upon the webs.

Another object of the invention is to provide a machine of the heretofore mentioned type wherein a plurality of paper webs, having printed form faces thereon and having file holes along one marginal edge thereof, are continuously fed through the machine for proper interleaving and are aligned longitudinally to bring adjacent form faces into proper register by engaging the file holes in the sheets and withdrawing the sheets from the machine by means of the file holes.

A still further object of the invention is to provide a machine of the aforementioned description wherein one or more webs are fed through the machine and wherein the means for withdrawing the paper webs from the machine consists of a drum having a variable diameter, which is driven in a definite speed ratio with the web feeding mechanism of the machine, and which diameter can be varied to change the length of web fed from the machine over a determined period of time to permit a different length cut-off sheet to be made by the cut-off means.

A still further object of the invention is to provide a machine wherein one or more paper webs are fed through the machine continuously and are withdrawn continuously, and wherein a cut-off means is provided for stopping the end of the web or web stack periodically to permit a moving knife to cut the web at a predetermined position, and to provide means for adjusting the stopping means of the cut-off device to agree with the file hole spacing of various width forms, interleaved and collated in the machine.

A still further object of the invention is to provide a machine for collating and interleaving a plurality of paper and carbon webs wherein a slack loop is always maintained in the paper web, and wherein the speed of feeding the webs is controlled by means of the length of the slack loop.

A still further object of the invention is to provide a machine of the aforementioned description wherein the webs are fed through the machine continuously and are withdrawn continuously, and wherein a cut-off means is provided for stopping the end of the web stack periodically to permit a moving knife to cut the web at a predetermined position, the web stopping means operating in cooperation with the file holes provided in a marginal edge of the paper webs.

A still further object of the invention is to provide a collating and interleaving machine wherein a plurality of paper webs having printed form faces are interleaved with a plurality of carbon webs and are aligned transversely simultaneously and are aligned longitudinally by the means which withdraw the interleaved webs from the machine, and while being aligned transversely a continuous line of adhesives is applied to the paper web a marginal distance inwardly from the edge thereof, whereafter the webs are brought together while in their transversely aligned relation and in proper longitudinal register and caused to adhere together while being withdrawn from the machine.

Further objects and advantages will be discovered upon a full disclosure in the following description.

In the drawings:

Figure 2 is an end elevational view taken along line 2—2 of Figure 1 with the paper and carbon webs removed to more clearly show the aligning means for the webs;

Figure 3 is an end elevation looking in the direction of the arrow of line 3—3 of Figure 1 and shows the cut-off device for the machine;

Figure 6 is an end elevation of the feeding mechanism for the machine showing the positioning of the paper and carbon web rolls and looking in the direction of the arrow 6 of Figure 1;

Figure 7 is a diagrammatic perspective view of the drive mechanism for the operating elements of the machine;

Figure 8 is a diagrammatic perspective view showing the web feeding mechanism and the control system for the same;

Figure 9 is a diagrammatic perspective view showing the paper and carbon web aligning means and the adhesive applying means and the manner in which the carbon and paper webs are brought together in proper alignment and register;

Figure 10 is a longitudinal cross-sectional view taken along line 10—10 of Figure 3, showing the drum for withdrawing the webs from the machine and the cut-off device;

Figure 11 is an enlarged view of the web guide mounted in operative relation with the means for removing the web from the withdrawing drum;

Figure 12 is a partial plan view showing the positioning of the web guides;

Figure 13 is an enlarged partial elevational view showing the cam for operating the cut-off knife of the cut-off device;

Figure 14 is an enlarged cross-sectional view of the cut-off device and shows the means for stopping the movement of the web stack through the cut-off device, the stopping means being in position to permit operation thereof;

Figure 15 is a view similar to Figure 14, but shows the web stopping means in position to hold the web stationary while the cut-off knife operates;

Figure 16 is a view of the web stopping means of Figures 14 and 15 shown in a position just after movement of the cut-off knife has caused release of the stopping means to permit the web to advance through the cut-off device;

Figure 17 is a partial cross-sectional end elevational view of the web stopping means of the cut-off device and shows the means for adjusting the position of the web stopping tooth of the device;

Figure 18 is a cross-sectional view of the web driving means for feeding the web through the machine and is taken along line 18—18 of Figure 1;

Figure 19 is an elevational view taken along line 19—19 of Figure 3, showing the operating means for the cut-off knife of the cut-off device;

Figure 20 is a cross sectional view taken along line 20—20 of Figure 19 showing the operating mechanism for the cut-off knife;

Figure 21 is a vertical cross-section taken longitudinally of the web withdrawing drum of the machine looking substantially in the direction of the arrows 21—21 of Figure 7, showing the gluing mechanism for the machine;

Figure 22 is a vertical cross-section taken longitudinally of the web withdrawing drum looking substantially in the direction of the arrows 22—22 of Figure 7, and shows the means for driving the mechanism of the gluing device;

Figure 23 is a cross-sectional view taken along line 23—23 of Figure 22, showing the drive pulley for the gluing device;

Figure 24 is a side elevation of the web withdrawing drum;

Figure 25 is a transverse cross-sectional view of the withdrawing drum taken along line 25—25 of Figure 24;

Figure 26 is a plan view of the gluing device with the top cover removed;

Figure 27 is a transverse cross-sectional view taken along line 27—27 of Figure 26;

Figure 28 is a longitudinal cross-sectional view of the gluing device taken along line 28—28 of Figure 27, showing the gluing device in operative relation with a paper web;

Figure 29 is an enlarged cross-sectional view taken along line 29—29 of Figure 27, showing the configuration of the edge surface of the glue wheel in operative relation with a paper web;

Figure 34 is a plan view of the portion of the variable speed transmission showing the indices plate;

Figure 35 is a cross-sectional view taken substantially along line 35—35 of Figure 7, showing the variable speed transmission gearing.

Figure 1:
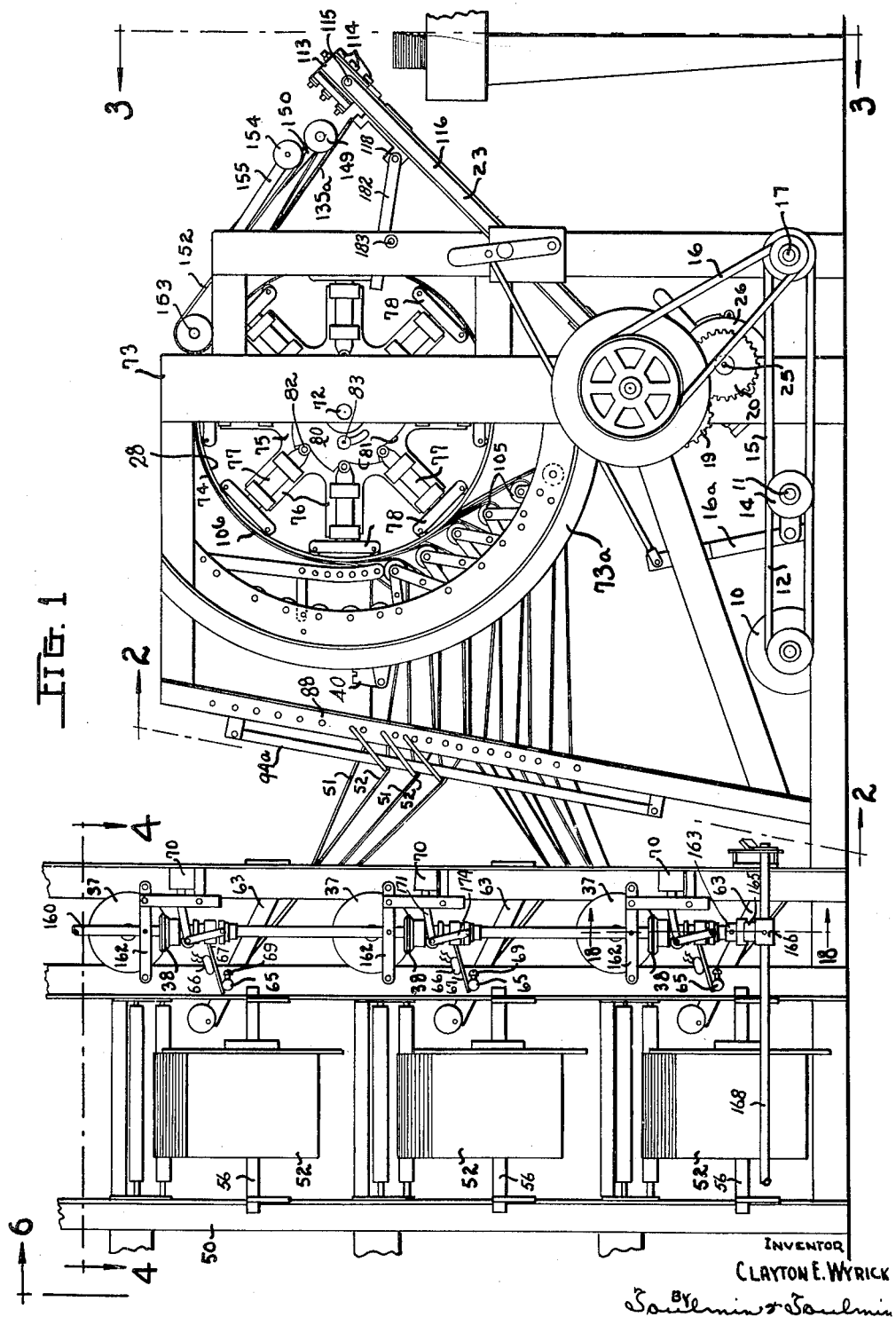
Figure 1 is a side elevational view of the machine taken from the side of the machine upon which the carbon webs are positioned and showing the driving means for feeding the webs through the machine.

The machine of this invention is for the purpose of collating and interleaving a plurality of paper and carbon webs in a manner that the carbon webs will be aligned transversely of the paper webs a marginal distance inwardly of the edges of the paper webs. The carbon webs are aligned roughly before entrance into the feeding device for removing the paper and carbon webs from the respective rolls. The webs are then fed longitudinally of the machine, and successive pairs of paper and carbon webs are brought into interleaved arrangement with other webs as they pass through the machine so that as the plurality of webs leave the collating portion of the machine, the webs will be interleaved by pairs in the proper number to form a web stack. The carbon webs are then aligned accurately transversely with respect the paper webs and a pair of glue lines are applied to the under side of the paper webs, the paper webs being aligned with respect the adhesive applying means so that the adhesive lines will be positioned a marginal distance from one edge of the paper webs. The paper and carbon webs, in their transversely aligned condition are withdrawn from the machine by means of a drum upon which suitable pins are mounted for engaging file holes provided in a marginal edge of the paper webs and located between the glue lines provided on the web. The pins upon the withdrawing drum align the paper webs longitudinally so that the adjacent forms printed upon the webs will be brought into proper register. The withdrawing means also causes the adjacent paper and carbon webs to adhere to one another since the web stack is drawn over the withdrawing drum for a short arcuate distance, whereby the carbon webs will be caused to adhere to a line of adhesive while the paper webs are caused to adhere to each other. The web stack, as secured in the aforementioned manner, is advanced through a cut-off device which cuts the web into a plurality of multiple forms.

The drive for the machine consists of an electric motor 10 which drives a speed changing device 11 by means of the belt 12. The speed changing device 11 is a conventional unit wherein the sheaves of the pulleys 13 and 14 are spring pressed toward each other so that if the device is moved with respect to the belts 12 and 15, the effective diameters of the pulleys 13 and 14 will change to produce a different driven speed through the belt 15. Manual means is provided for moving the speed changing device 11, such as the lever 16a. The drive means for the machine from the speed changing device 11 is through the belts 15 and 16, between which the idler shaft 17 is interposed, to the gear 18. The gear 18 drives a gear 19 which in turn drives a gear 20. A cam member 21 is mounted upon the shaft 22, rotated by the gear 19, and cooperates with a lever 23 for periodically moving the cut-off knife 24.

The gear 20 drives through a shaft 25 and a step transmission 26 to a shaft 27, which in turn drives the drum 28 by means of the worm 29 and worm wheel 30. The drum 28 is adapted to remove the paper webs from the machine as fed into the machine by means of the fluted feed roll 35 and the fluted friction roll 36. The drive roll 35 has mounted on the end thereof a disk 37, which is frictionally engaged by a disk 38 to cause rotation of the disk 37, and thus advance the paper web between the rolls 35 and 36. The feed roll 35 and the friction roll 36 are driven at the same peripheral speed by means of the gears 35a and 36a, the gear 35a being driven by the friction disk 37. The friction disk 38 is connected by suitable shafting to the drive shaft 27 of the drum 28.

The drum 28 and the feed roll 35 are driven in the proper speed ratio so that paper will be fed through the rolls 35 and 36 as fast as the drum 28 will remove the paper from the machine. The linear speed of the paper webs through the machine can be changed, however, by means of the step transmission 26 to thereby increase or decrease the length of paper web passing the cut-off knife 24 over a determined period of time. Since the knife 24 always operates at a constant speed, it can be seen that the length of the web cut off by the knife can be varied by varying the linear speed of the paper webs fed through the machine.

The variable speed or step transmission 26 consists of a plurality of spur gears 41 mounted upon and suitably keyed to the output or driven shaft 27 of the step transmission. The spur gears 41 are of increasing diameter so that a driving gear engaging therewith will cause the shaft 27 to be driven at different speeds, according to the setting of the step transmission 26. The input or drive shaft 25 for the transmission 26 is provided with a driving gear 42 suitably keyed and splined upon the shaft 25. The input shaft 25 is driven at a substantially constant speed through the drive mechanism from the electric motor 10. The shaft 25 and the cutoff knife drive shaft 22 are suitably geared together by the gears 19 and 20 to maintain a constant speed ratio therebetween.

To change the speed of rotation of the output shaft 27 of the transmission 26 the drive gear 42 must be brought into geared relationship with one of the spur gears 41. The drive gear 42 is carried upon a fork 43 which is pivotally mounted upon the shaft 25. The fork 43 is provided with an idling gear 44 suitably mounted upon one prong of the fork and with a compound idling gear 45 suitably mounted upon the opposite prong of the fork, which gears are in constant mesh with the drive gear 42. Since the drive gear 42 is splined upon the drive shaft 25 it can be seen that the drive gear 42 can be carried by the fork 43 along the shaft 25 until one of the gears 44 or 45 are opposite the proper spur gear 41 to obtain the desired speed relationship between the input shaft 25 and the output shaft 27. The fork 43 is then pivoted to bring either gear 44 or 45 into meshing relation with the selected spur gear 41 whereby the output shaft 27 is driven in a known speed relationship to the input shaft 25. The compound gear 45 is arranged to give double the speed relationship between gears 41 and 42 as the gear 44. Since the speed relationship between the cut-off knife drive shaft 22 and the input shaft 25 is constant, it can readily be seen that the output shaft has a definite speed relationship to the speed of operation of the cut-off knife 24, which speed relationship can be changed by the transmission 26.

Since the shaft 27 drives the feeding drum 28, it follows that the speed relationship between the drum and the cut-off knife 24 is controlled to the extent that for each revolution of the drum 28 the cut-off knife 24 will make a determined number of strokes, thereby severing a determined number of sheets of determined length from the paper web as it is fed through the cut-off knife 24 for each revolution of the drum 28.

As heretofore mentioned, the operation of the cut-off knife is constant, and since the drum 28 will pass a determined quantity of paper web through the knife 24 for each speed of the step transmission 26, the various steps of the transmission can be indicated with numerals which indicate the number of strokes of the knife 24 per revolution of the drum 28 and thus the number of sheets severed from the web.

An indices plate 46 is thus provided for the transmission 26 which is provided with a plurality of slots 47, each of which slots carries a number indicating the number of sheets which will be severed from the web at that particular setting of the transmission 26.

The paper webs, as fed through the machine, are adapted to have the underside thereof engage the adhesive applying means 40, which applies adhesive in two continuous lines to the under side of each of the paper webs fed through the machine. The carbon web is adhered to the paper by means of the innermost adhesive line, while the adjacent paper webs adhere together by means of the outermost adhesive line. The adherence of adjacent paper and carbon webs being brought about by advancement of the web stack over an arcuate portion of the drum 28.

Figure 4:
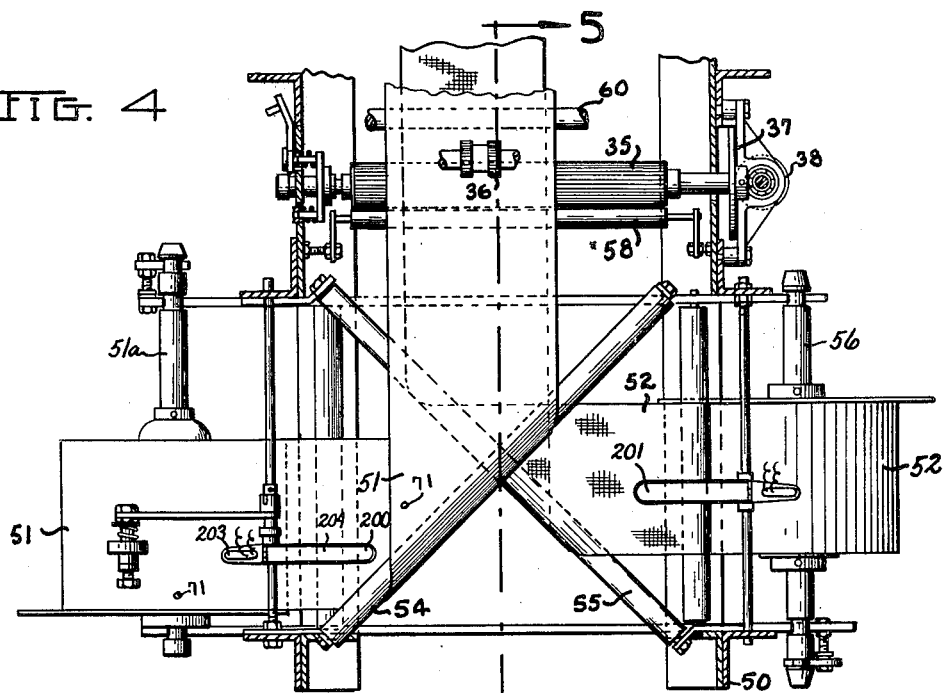
Figure 4 is a plan elevational view taken along line 4—4 of Figure 1 showing the drive means for the paper and carbon webs.

In this invention the machine consists of a frame 50 upon which a plurality of paper web rolls 51 and carbon web rolls 52 are positioned. The paper and carbon web rolls 52 and 51 are arranged in banks, one above the other, the paper web rolls being arranged on one side of the machine, while the carbon web rolls are arranged on the opposite side of the machine. The paper and carbon webs are fed from the rolls 51 and 52 respectively transversely of the machine. The direction of feeding the webs 51 and 52 (the respective webs are designated by the same number as the rolls) is changed from a transverse direction to a longitudinal direction by means of the rods 54 and 55 (see Figure 4) which are positioned at an angle of 45° with respect the transverse and longitudinal motion of the respective webs. These rods 54 and 55 thereby permit the paper and carbon webs 51 and 52 to be fed transversely into the machine and their direction of feeding to be changed into a longitudinal direction immediately upon entrance into the machine.

The manner of changing the direction of feeding from transverse to longitudinal by means of the rods 54 and 55 also provides means for roughly aligning the carbon web 52 with respect the paper web 51 so that the carbon web 52 will be positioned a marginal distance inwardly from the edges of the paper web 51. By shifting the carbon roll 52 upon its supporting shaft 56 the position of entrance of the edges of the carbon web 52 may be controlled with respect the position of entrance of the paper web 51, so that when the direction of feeding is changed from transverse to longitudinal the carbon web 52 will be roughly aligned with the paper web 51 a marginal distance inwardly from the edges thereof.

To feed the carbon and paper webs 51 and 52 into the machine the feed roll 35 is provided over which the carbon and paper webs 51 and 52 are threaded. The carbon web 52 is threaded over the rod 55, with the carbon face outwardly from the rod, and over the rolls 57 and 58 into engagement with the feed roll 35, over which the carbon web is carried. A slack loop 59 is provided in the carbon web 52, which is positioned below the point of entrance of the carbon into its longitudinal travel through the machine, which is directed by the roll 60.

The paper web 51 is threaded under the rod 54 and over the top thereof and has the printed face on the top side as the web passes through the machine. The web 51 is then carried, or threaded, over the feed roll 35 to the point of entrance of longitudinal travel of the web 51 through the machine over the roll 60. It is thus seen that the carbon and paper webs 51 and 52 pass through the machine in pairs with the carbon web being positioned adjacent the under side of the paper web and with the carbon face away from the under side of the paper web.

To provide for interleaving of the various pairs of carbon and paper webs fed through the machine so that a plurality of copies of printed forms may be arranged adjacent each other with interleaved carbon, the pairs of paper and carbon webs are sent through the machine longitudinally, after being fed from the rolls as heretofore described, in successive vertically arranged parallel layers. According to the number of copies desired, the proper number of carbon and paper webs are threaded through the machine into operative engagement with the withdrawing drum, hereinafter described, which removes the interleaved sheets of webs from the machine as they are fed.

The feeding device for the paper and carbon webs 51 and 52 also consists of a roll 36 which is pivotally mounted upon the roll 60 and which frictionally engages the paper web 51, passing over the feed roll 35. The feed of the roll 36 provides frictional engagement of the paper and carbon webs 51 and 52 with the feed roll 35 to thereby draw the webs from the web rolls 51 and 52.

Since the webs 51 and 52 are fed by frictional engagement with the feed roll 35, it is highly improbable that the rate of feed of the webs can be accurately synchronized with the rate of removal of the webs from the machine, since the removal means causes a positive withdrawal of the webs. A control means is thus provided for varying the speed of the web feed in response to the length of the slack loop 61 provided in the paper web 51. (See Figure 8.) An arm 63 having a roll 64 on the end thereof is secured upon a shaft 65 and is arranged to have the roll 64 positioned within the slack loop 61, so that if the slack loop 61 varies in length the arm 63 will be raised and lowered.

The normal adjustment for feeding the webs through the machine is such that the drum 28 will remove the webs from the machine at a slightly greater rate than the feed roll 35 will feed the webs into the machine, so that the tendency is to always shorten the slack loop 61 of the paper web 51.

A mercury tube switch 66 is mounted upon an arm 67 which is pivoted at 68. The arm 67 is in operative association with the rod 65 upon which the arm 63 is rigidly mounted. As the slack loop 61 shortens in length the arm 63 will be raised causing rotation of the shaft 65 and a screw 69 mounted therein. The screw 69 engages the arm 67 to move the same until the pool of mercury in the switch 66 bridges the contacts thereof to close a circuit to a solenoid 70.

The solenoid 70 is operatively interconnected with the driving friction disk 38 to cause the disk to be raised toward the center of the driven disk 37, whereby the disk 37 is caused to rotate at a higher speed, whereby the feed roll 35 will cause an increase in the rate of feeding of the webs 51 and 52. The increased rate of feed of the webs will continue until the slack loop 61 of the paper web 51 has again lengthened to break circuit in the switch 66 and the solenoid 70 to thereby release the driving friction disk 38 into its previous position. This arrangement provides an automatic control of the rate of the web feeding device to match the slightly greater rate of removal of the web from the machine by the drum 28.

The paper web 51 is provided with file holes 71, which are to be used for aligning the adjacent sheets of paper webs longitudinally to bring the form printed on the adjacent webs into proper register.

The drum 28 is mounted upon an axle 72 journaled in the frame 73, and is rotatively driven through means of the variable speed transmission as heretofore described. The drum 28 consists of an open ended cylinder 74 which is mounted upon a plurality of arms extending radially from a hub 75. (See Figures 10, 24 and 25.) The hubs 75 are mounted upon a drive shaft 72, which is driven by means of the worm wheel 30 (see Figure 7) and are spaced from each other upon the shaft 72 by means of the spacing collar 76a. The radially extending arm 76 of opposed hub members 75 are secured together transversely by means of the spacing bars 77a, which are retained in position between the arms 76 by means of the bolts 78a passing through the arms 76 into the spacing rods 77a. This arrangement provides a rigid structure adapted to support the cylinder 74 upon a plurality of radially extending and slidable arms 77. Each of the arms 77 are slidably mounted upon the arms 76 extending radially from the hub 75 and carry an arm 78 upon which the rollers or tubes 79 are mounted. A centrally mounted hub 80 is provided with a plurality of cam surfaces 81. The arms 77 have rollers 82 mounted upon the inwardly extending ends thereof and which engage the cam faces 81. The hub 80 is rotatable with respect to the hub 75 so that the radially extending arms 77 will carry the arms 78 and the rolls 79 a greater distance from the center of the drum whereby an increased diameter drum may be secured, by means of the arms 77, upon the hub 75. After the rolls 79 securely engage the drum 74 the bolts 83, extending through the hub 80 into the hub 75 are tightened to retain the position of the arms 77. A metal band 84 extends around the drum 74 against which the drum 74 is expanded and is provided with a plurality of pegs 85, one of which is a master peg 85a.

These pegs 85 are adapted to engage the file holes provided in the marginal edge of the paper webs to cause withdrawal of the webs from the machine as the drum 28 rotates, and maintain alignment of adjacent printed forms upon the paper webs 51 to cause proper register of the adjacent forms.

Figure 5:
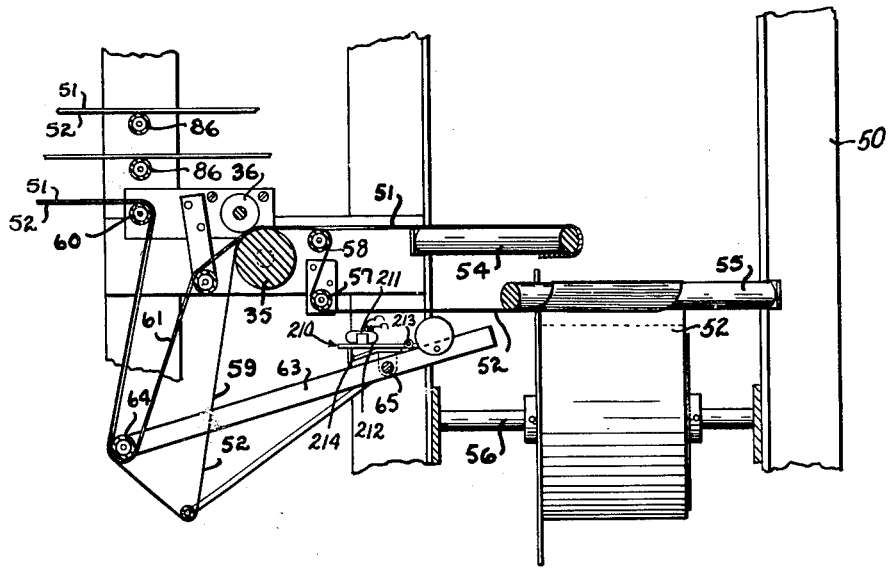
Figure 5 is a longitudinal cross-sectional view taken along line 5—5 of Figure 4.
Figure 30:
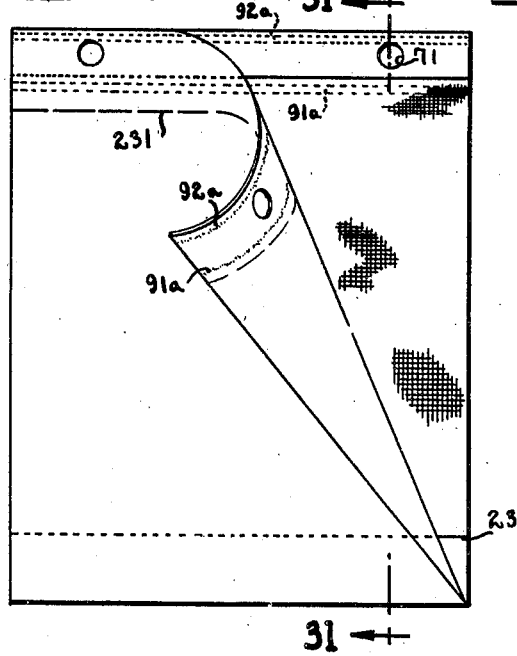
Figure 30 is an elevational view of the product manufactured on the machine of this invention.
Figure 31:
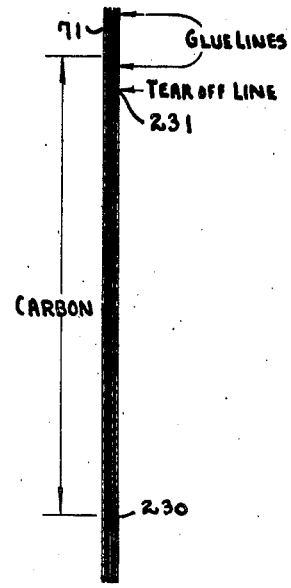
Figure 31 is a cross-sectional view of the product, taken along line 31—31 of Figure 30.

As each pair of paper and carbon webs 51 and 52 are fed into the machine by means of the feeding rolls 35 and 36 they are changed in their direction of motion to travel longitudinally of the machine. Each of the pairs of paper and carbon webs are provided with individual feeding means, all of which are driven from a common drive shaft (see Figure 1) so that the speed of feeding the various pairs of webs will be uniform. The webs are brought into the machine transversely at different elevations so that the adjacent pairs of webs can be interleaved with each other. The webs are supported in their longitudinal travel through the machine by means of suitable rollers 86 (see Figure 5). The interleaved paper and carbon webs 51 and 52 respectively, leave the collating portion of the machine and enter an aligning and gluing portion of the machine wherein the webs are also cut periodically into the desired size of form.

The webs are threaded through the machine manually and are manually aligned upon the pegs 85 and the drum 28 so that the various adjacent printed forms will be in proper register. After the paper webs have once been aligned upon the drum 28 the pegs 85 will maintain the alignment through engagement with the file holes in the marginal edge of the paper webs 51, while withdrawing the webs from the collating portion of the machine.

Between the drum 28 and the collating portion of the machine the paper and carbon webs are accurately aligned transversely with respect each other to provide a marginal edge between the edge of the carbon web 52 and the paper web 51. While the paper and carbon webs are being aligned, continuous lines of adhesive are being applied to the under side of the edge of the paper web 51 by means of the adhesive applying device 40.

As the paper and carbon webs 51 and 52 leave the collating portion of the machine the webs are separated and are adapted to pass over and under individual rollers. As the webs enter the gluing portion of the machine from the upper portion of the collating machine the webs will pass under the rollers. While, if the webs enter the gluing portion of the machine from the lower portion of the collating portion of the machine the webs will pass over the rollers. The rollers are mounted in a frame member 88 and consist of a shank portion 81 having collars 90 mounted thereon. The collars 90 are adjustable upon the rollers to permit adjustment of the webs upon the rolls. The edges of the paper webs 51 are aligned by means of the collars 90 mounted upon the rollars 89, while the carbon webs are aligned by means of the collars 90a mounted upon the rollers 89a (see Figure 9).

Guide rods 94a are supported upon the frame 73 and are positioned in advance of the rollers 89 and 89a. These guide rods 94a provide a pre-alignment of the paper webs 51 before advancing into engagement with the alignment roller 89, whereby the paper webs 51 are insured of proper entrance into the aligning rollers 89.

To align the paper and carbon webs with respect each other transversely and longitudinally the paper webs are positioned upon the drum 28 with one of the file holes 71 in engagement with the aligning pins 85. The carbon webs 52 have been interleaved with the paper webs 51 and are manually aligned in proper transverse position to provide the desired margin along the edges of the web stack.

The rollers 89 and 89a with the cooperating collars 90 and 90a will accurately align adjacent paper and carbon webs 51 and 52 upon entering the gluing portion of the collating machine. This alignment is further maintained by means of a guide bracket 91 supported upon the rod 92, which supports the adhesive applying device 40. As heretofore mentioned, the paper and carbon webs are separated upon entering the gluing and aligning portion of the machine, the carbon web passing below the adhesive applying device 40, while the cooperating paper web passes over the adhesive applying device of the machine, whereby continuous lines of adhesive are applied to the underside of the paper web 51.

Since the pegs 85 in the rotating drum 28 maintain accurate register of adjacent form faces printed on the plurality of webs, and since the paper and carbon webs 51 and 52 are aligned transversely by means of the collars 90 and 90a of the rollers 89 and 89a, it can be seen that when the interleaved webs of paper and carbon sheets are brought into engagement over an arcuate portion of the drum 28, that the adjacent webs will be caused to adhere together in proper alignment and register.

The adhesive applying device 40 over which the paper web 51 travels in its forward motion, past the aligning roller 89, is arranged to provide two glue or adhesive lines 91a and 92a to the under side of the paper web 51. The device consists of a container 93 in which there are positioned therein two disks 94 and 95 mounted upon a suitable spool 96, which in turn is secured to a drive shaft 97. The container 93 is removably mounted upon the transversely positioned rods 92 and 93a arranged between the arcuate frame members 73a. The spool 96 is keyed to the drive shaft 97 in any suitable manner, as by the spring pressed key 98. The drive shaft 97 is provided with a pulley 98 (see Figures 7, 22 and 23), which is belt driven from the drum 28 by means of the belt 99. The pulley 98 is of the same diameter as the disks 94 and 95, whereby the disks will be rotated at the peripheral speed of the drum 28, and since the webs are drawn across the adhesive applying disks 94 and 95 by means of the drum 28 the peripheral speed of the adhesive applying disks 84 and 95 will be the same as the linear speed of the paper web 51. The adhesive applying disks 94 and 95 travel between the grooves 100 and 101 respectively, positioned in a wiper arm 102. The edges of the grooves 100 and 101 remove excess adhesive from the sides and edge of the disks 94 and 95. The wiper arm 102 is provided with an adjusting screw 103 to locate the end of the grooves 100 and 101 with respect the edge surfaces of the disks 94 and 95 to remove all but the right amount of glue or adhesive to be applied to the paper web 51. Since the adhesive applying disks 94 and 95 rotate at a peripheral speed equal to the linear speed of the paper web 51, there will be no slippage between the elements which would tend to produce an uneven quantity of glue or adhesive along the lines of application.

The edge surfaces of the glue wheels are provided with an under cut portion 103a. The under cut portion may be gauged to carry just the right amount of glue or adhesive to be applied along the lines of application. Any tendency towards excess material upon the disks 95 and 94 would drain into the under cut portions in the edge surfaces, thereby relieving the excess at the point of application and permitting the same to drain around the edge of the wheel.

An adhesive applying device 40 is provided adjacent the under side of each of the paper webs 51 and is positioned between the aligning rolls 89 and the drum 28, so that the paper webs 51 are properly aligned transversely with respect the carbon web 52 when passing over the adhesive applying device 40. The carbon web 52 has been aligned by the roller 89a and the collars 90a transversely with respect the paper web 51 so that the edge of the carbon web 52 is positioned a marginal distance inwardly from the edge of the paper web 51. The paper web 51 and the carbon web 52, in proper transverse alignment and in proper longitudinal alignment are brought together, after the adhesive has been applied to the under side of the paper web 51, under the rolls 105; at which point the carbon web is caused to adhere to the innermost adhesive line upon the paper web 51, thereby securing the carbon to the paper web in aligned relation immediately after the application of the adhesive. The pairs of carbon and paper webs, 51 and 52, are advanced over their respective rolls 105 by means of the pins 85 in the drum 28 and are brought into engagement with each other upon the surface of the drum 28. The interleaved web stack is carried over an arcuate portion of the drum as indicated at 106, at which time the outermost line of adhesive, applied to the under side of each of the paper webs 51, causes adherence between adjacent paper webs in their properly aligned transverse position and in proper register with each other. This arrangement provides means for continuously aligning and bringing into proper register a plurality of interleaved paper and carbon webs and maintaining the alignment while applying adhesive to the paper webs, and for causing adherence between the paper webs and the carbon webs and the paper webs with each other while maintaining the alignment and registration.

The web stack in its adhered condition is drawn over the arcuate portion and the drum as indicated at 106 by means of the pins 85 toward a stripper plate 110. The stripper plate 110 removes the web stack from the drum 28 and causes the same to be directed over a bed plate 111 toward the cut-off device 112.

The cut-off device 112 consists of a cut-off knife 24 carried by a reciprocal head 113. The knife 24 is secured to the head 113 by any suitable means such as the bolts 114. The head 113 is carried by a rod 115 which projects beyond the end of the head 113 and engages a pull bar 116. A rigid frame member 117 supports a frame member 118 to which is bolted the cutting bed 119 for the knife 24. The frame member 117 extends upwardly from a frame member 120 to support the upper frame member 118 and the knife bed 119, and also provides means to guide the head 113 in its reciprocatory movement caused by movement of the pull bar 116. The pull bar 116 is secured at its lower end to a rod 121 which extends between the pull bar 116 and a corresponding pull bar interconnecting the opposite ends of the rods 115 and 121 for operating the knife 24. The rod 121 is journaled in a bracket 122 which carries a stud 123 and a roller 124. A plate member 125 encloses the lower end of the support member 117 and provides means, in combination with the bracket 122, for guiding reciprocatory movement of the stud 123 and the roller 124. The roller 124 rides the inner cam surface 126 of the rotating cam member 21. A raised portion 127 is provided on the inner cam surface 126 which engages the roller 124 to cause the same to be moved downwardly, thereby pulling the pull bar 116 downwardly through the rod 121, the bracket 122 and the stud 123. The pull bar 116 thereby reciprocates the head 113 and the knife 24 upon each rotation of the cam 21.

A spring 128 is provided between the support 118 and the rod 121 to cause the roller 124 to always engage the cam surface 126 and to return the knife 24 to its raised position. A cam member 128a is positioned on the outer face of the cam 21 and is adapted to engage a roller 129a to insure return of the pull bar 116 if the spring 128 should fail. A stripper plate 129 is reciprocally mounted in the head 113 and is adapted to engage the web stack when the knife 24 moves through a downward stroke and return to prevent the knife from flipping the ends of the web stack upon the up stroke thereof. The stripper plate has spring pressure applied thereon when in position by means of a spring 129b.

In order to stop the forward advancement of the web stack while the knife 24 is cutting off a predetermined length of web stack, a stopping or holding device is provided and consists of a wheel 130 whereon there are provided two teeth 131. These teeth 131 are adapted to engage the file holes 71 in the web stack as it advances through the cut-off device 112 and hold the web stack from forward advancement until the knife 24 has sheared the stack. The stop wheel 130 is rotatably mounted upon the arm 133 by means of a pin 134 which forms the axle for the wheel 130. The arm 133 is pivotally carried upon the arm 132 by means of the pin 135, and the arm 132, in turn is pivotally mounted upon the pin 136. The pin 136 is provided with means (not shown) to bind the arm 132 into position upon the pin 136 so as to maintain the position of the wheel 130 upon the web stack passing through the cut-off device. The wheel 130 is retained in friction engagement with the web stack as it passes over the bed 135a of the cut-off device and is driven thereby. Movement of the web stack across the bed 135 causes the wheel 130 to be revolved about its axle 134. The wheel 130 has mounted thereon two cam plates 136 and 137, the cam plate 137 being rotatable with respect the cam plate 136 and adapted to be retained in the position, as shown in Figure 14, by means of a spring 138. A pawl 139 is pivotally mounted upon the pin 140 carried by a plate 141. A spring 142 is positioned between the pins 143 and 143a. Pin 143 is mounted in the plate 141, while pin 143a is mounted in the pawl to retain the pawl 139 into engagement with the edge surfaces of the cam plates 136 and 137.

As the wheel 130 is rotated by means of forward advancement of the web stack across the bed 135 the cam surfaces will also rotate until the abutments 144 and 145 on the cam plates 136 and 137 respectively are engaged by the pawl 139 whereby rotation of the wheel 130 is halted. This position of the wheel 130 is shown in Fig. 15 with the wheel 130 halted by means of the pawl 139 in engagement with the abutments 144 and 145 and with the spring 138 tensioned. In this position the knife 24 is ready to shear the web stack. Upon further downward movement of the knife 24 the arm 146 carrying the adjustable pin 147 causes engagement of the pin 147 with the end of the pawl 139 to cause same to release from engagement with the abutments 144 and 145. At this time the abutment 145 of the cam plate 137 is advanced to prevent re-engagement of the pawl 139 when the arm 146 is retracted (as shown in Figure 16).

When the stop wheel causes a halting of the forward motion of the web stack through the cutting device, the web stack will build up a slack behind the wheel, as indicated at 148, since the web stack is being continuously fed from the drum 28. To remove this slack, as indicated at 148, a feed roll or gripper 149 is pivotally mounted upon an arm 150 (see Figure 10), which arm is pivoted at 151. The feed roll 149 is thus carried by its own weight in friction engagement with the web stack passing through the cut-off device. The feed roll 149 is driven at a higher peripherial speed than the linear speed of the web stack through the cut-off device by means of the belt 152, which engages a pulley on the feed roll 149 and the pulley 153. The pulley 153 retains the belt 152 in engagement with the surface of the drum 28 to provide driving means for the feed roll 149. An idler pulley 154 secured to an arm 155 and pivoted at 156 provides tension for the belt 152. Since the feed pulley 149 revolves at a higher peripherial speed than the linear speed of the web stack feeding through the machine, it may be seen that the slack of the web stack, indicated at 148, can be immediately removed by the feed roll 149 when the wheel 130 releases the web stack.

To provide adjustment for the position of the teeth 131 with respect to the file holes 71 of the web stack, the position of the pawl 139 can be shifted. A slot 157 is provided in the plate 141 and cooperates with a binding nut 158 to retain the plate in position upon the supporting arm 133 after the adjustment has been made. Further adjustment of the wheel 130 can be made by swinging the arm 134 about the pivot 136 and thereafter binding the arm 134 in position thereon. The function of these adjustments will be more fully described hereinafter.

The collating and interleaving machine is adapted to be adjusted in order to produce a plurality of interleaved paper and carbon forms of any desired length or width. The length of the individual forms is determined by the width of the webs upon which the forms are printed. The width of each of the forms may be varied according to the material desired upon the form and the machine must be capable of being accurately adjusted to cut the desired width of form from the continuous web as passing through the machine, the width of the form running longitudinally of the web. There are several points of adjustment for the machine, the first of which is the step transmission 26. Since, as heretofore described, the cut-off knife 24 operates at a constant speed it may be seen that if the linear speed of the paper is increased or decreased the width of the web cut can be varied. The step transmission provides means whereby the speed of feeding of the web through the machine can be varied in definite predetermined steps, which arrangement will take care of certain forms the widths of which are exactly divisible into the circumference of the drum 28 whereby a whole number of forms can be severed for each revolution of the drum, the width of the form being such that one of the steps in the transmission will feed the web at the proper speed to pass the proper lineal amount of paper through the machine between the cut-off cycles. Thus, if the width of the form agrees with the linear speed at which the transmission can feed the web, the only change in operation of the machine to accommodate the machine to the different width form is to manually shift the transmission 26 into the proper speed range, which in turn will drive the feed rolls 35 and 36 at the increased speed through the friction disks 37 and 38. The drum 28 will rotate at an increased speed but in the same ratio as the drive roll 35 and 36, and in the proper ratio with the cut-off knife 24 to produce the desired width of form. The knife 24 will cut off the web at a constant speed, as before, but the width of the form will have been changed due to the increase of the linear speed of the web through the knife. Thus, the change of the step transmission changes only one function of the machine, and that is to increase the speed at which the webs are fed through the machine.

If, however, the width of the form is such that the various speed ranges of the step transmission 26 are incapable of transmitting the webs through the machine at the proper linear speed to obtain the desired width form, it then becomes necessary to provide an additional adjustment to accommodate the form and transmit the webs at exactly the proper linear speed so that the cut-off knife 24, which operates at a constant speed, will sever successive forms at the proper intervals.

Under these conditions the drum 28 is altered in circumference to the extent that the new circumference is an exact multiple of the width of the sheet to be severed. The metal band 84, which carries the pins 85 for registering adjacent form faces, is removed from the drum cylinder 74 and a new band of a length which is an exact multiple of the width of the sheet is placed upon the drum cylinder 74. To accommodate the new band 84 upon the drum cylinder 74, the bolts 83, extending through the cam hub 80, are loosened to permit the arms 77 to move inwardly against the lowest portion of the cam faces on the hub 80. The arms 77 are retracted by means of the springs 79a. The drum cylinder 74 is provided with an overlapping joint, as indicated at 74a, to permit the drum cylinder to be expanded or contracted. The new band 84, with its aligning pegs 85, is positioned over the drum cylinder 74 and the ends thereof are positioned over the master peg 85a, which peg is secured permanently to the drum cylinder 74. The cam hub 80 is then rotated to force the arms 77 outwardly to cause the rolls or tubes 79 to engage the drum cylinder 74 and tighten the same against the new band 84 positioned thereon. The bolts 83 and then tightened to retain the drum diameter. The altered circumference of the drum will change the peripherial speed thereof and cause the webs to be removed from the machine and fed to the cut-off device 112 at the proper rate of speed to produce the desired width form. The step transmission is set to the position which will rotate the drum at the proper speed ratio with respect the knife 24 to produce the number of cut-offs per revolution of the drum which is equal to the total number of forms present upon the drum 28 for one revolution thereof. The indices on the plate 46 providing means for quickly selecting the proper position of the transmission drive.

Since it is necessary that the peripherial speed of the drum 28 shall be in substantial synchronism with the speed of feeding the paper webs by means of the feed rolls 35 and 36, it may be seen that an altered diameter of the drum will throw the feed rolls 35 and 36 out of synchronism with the peripherial speed of the drum 28.

In order to re-synchronise the rate of feed of the webs by the rolls 35 and 36 with the rate of withdrawal by means of the drum 28, means are provided for altering the position of the driving frcition wheel 38 upon the driven friction wheel 37. The device is the same mechanism which is used for controlling the speed of the feed rolls 35 and 36 to change the rate of feed of the webs 51 and 52 therethrough in accordance with the length of the slack loop 61 of the paper web 51. In the former instance, the solenoid 70 automatically changes the position of the friction drive wheel 37 with respect the driven wheel 38, while in the present instance a manual shifting of the drive wheel 37 with respect the driven wheel 38 is accomplished. However, the former automatic function of control of the web feed is not interfered with.

This speed control device (see Fig. 18) consists of the drive shaft 160 upon which the driving friction wheel 37 is suitably mounted. The drive shaft 160 is bearinged in a bearing 161 carried by a support bracket 162 and is supported upon the lower end by means of a collar 163 carried by the bearing 164. The bearing 164 is supported upon the upper edge of a channel shaped bracket 165 which in turn is pivotally mounted upon a yoke 166 by means of the pin 167. The yoke 166 is secured to a shaft 168 which extends longitudinally along the machine and is adapted to communicate with a plurality of banks of feeding mechanisms, one of which is shown in the drawings as in Figure 1. The shaft 168 is suitably mounted upon the frame 50 of the machine to permit rotation of the shaft manually. When the shaft 168 is manually rotated the channel shaped member 165 will lift the drive shaft 160 vertically, whereby the position of the driving friction wheel 37 is altered with respect the driven friction wheel 38, to thereby change the speed of rotation of the wheel 38 and thus change the speed of the feed rolls 35 and 36. The rate of web fed through the rolls 35 and 36 may thus be adjusted to again bring the feed rate into substantial synchronism with the rate of withdrawal by the drum 28. Since all of the web fed drive means are arranged in vertical banks, as shown in Figure 1, and since all of the banks are altered simultaneously by means of the shaft 168, it is thus seen that the rate of feed of all of the webs will be brought into synchronism.

As heretofore mentioned, the automatic control for varying the web fed rate in response to the length of the slack loop 61 in the webs 51 is not interfered with by the change in position of the friction wheels 37 and 38. This automatic mechanism consists of the solenoid 70 which has an armature 170 (see Figure 8) to which there is attached an extending arm 171. A roller 172 is positioned upon the end of the arm 171 and is adapted to engage a recess portion 173 provided in the supporting shank of the friction disk 37. The roller 172 is also carried upon an arm 174 which is pivoted at 175. The pivot point 175 is retained in permanent position by means of the collar 176 secured to the drive shaft 160, the drive shaft 160 being freely rotatable within the pivot support 175. The arm 174 is arranged to cause the roller 172 to travel in an arcuate path when moved by the solenoid 70 and its armature 170, whereby the vertical position of the friction drive disk 37 is altered upon the driven disk 38 to change the speed of rotation of the feed rolls 35 and 36.

The elements comprising the automatic control of the feed roll controlling device are adapted to move with the drive shaft 160 when the position of the shaft 160 is altered manually by the shaft 168, whereby the same degree of automatic control over the feed rolls is maintained.

If the feed rolls should fall out of synchronism an adjustment is provided to alter the position of the friction disks 37 and 38. The adjustment consists of a collar 177 which is secured to the drive shaft 160 by means of the set screw 178. An extended portion of the shank of the driving disk 37 is in threaded engagement with the collar 177 and is retained in position by means of a set screw 179. By adjusting the threaded end of the shank in the collar 177, the speed of the friction disk 38 may be altered to bring the same into synchronism with the other feed mechanisms of the machine.

It is thus seen that the machine is capable of sufficient adjustment to alter the linear speed of the webs as fed through the machine to match the peripheral speed of the drum 28, whereby the exact amount of web can be fed through the cut-off device 112 to secure severance of successive forms at exactly the right point.

The machine is also capable of adjustment to meet the requirements of various spacings of file holes provided in the marginal edge of the paper web forms. When the metal band 84, carrying the aligning pegs 85 is made, the pegs 85 are spaced to match the file hole openings desired in the forms. Since the cut-off device 112 depends in its functioning to engage the file hole openings of the paper webs, it is seen that an adjustment of the position of the holding wheel 130 is required in order to properly align the teeth 131 with respect to the file hole openings 71.

When the webs have been threaded through the machine and the first form is carried through the cut-off device 112 and positioned in proper alignment with the cut-off knife 24, the web holding wheel 130 can then be adjusted to its proper position. The arm 134 (see Figure 10) is released upon its pivot 136 and the wheel 130 to permit the arm 133 and the stop wheel 130 to be moved longitudinally along the bed 135. The wheel 130 may then be rotated manually to bring one of the teeth 131 into proper register with one of the file holes 70 in the paper web within the cut-off device. With the wheel tooth 131 in proper position, the pawl 139 may not be in its proper position to cause the wheel 130 to stop with the tooth 131 at its lowermost point. To adjust the position of the pawl 139 with respect the cams 136 and 137, the plate 141 (see Figure 17) is adjustable upon the axle shaft 134 to shift the position of the pawl and bring it into proper engagement with the shoulders 144 and 145 of the cams 136 and 137. After the proper alignment has been accomplished the wing nut 158 is tightened to retain the alignment. The teeth 131 may be spaced around the wheel 130 in any suitable arrangement to function properly with respect to the desired file hole openings in the paper web stack as it passes through the cut-off device 112.

Under certain conditions it may be desirable to adjust the position of the cut-off knife 24. To provide for this adjustment the supporting frame 120 for the cut-off knife (see Figure 20) is pivotally mounted upon the step transmission 26 by means of an extending ear 180 and a stud 181. A supporting arm 182 extends between the knife frame 118 and the frame 73 of the machine to position the knife frame with respect the end of the bed 135 of the cut-off device 112. The position of the supporting frame for the cut-off knife 24 can thus be adjusted with respect the end of the bed 135, the arm 182 being retained in position upon the frame 73 by means of a binding screw 183.

Safety controls are provided upon the machine which function in cooperation with the webs passing through the machine. These controls are provided for stopping the machine if one of the webs being fed by the machine should break. Also, one of the controls is arranged to stop the machine if the slack loop 61 of the paper web 51 should become too long or too short.

A safety control 200 is provided upon the carbon web 52 and a safety control 201 is provided on the paper web 51. These controls 200 and 201 (see Figure 8) are positioned between the web rolls 51, 52 and the feed rolls 35, 36, and are arranged to indicate a web breakage between the rolls 51, 52 and the rolls 35, 36. Each of the safety devices 200 and 201 consists of a mercury tube 203 mounted upon an arm 204, the end of which is in engagement with its cooperating web 51 and 52. The arm 204 is adapted to hold the mercury tube 203 in a position to disconnect the electric circuit therethrough as long as the end of the arm 204 is in engagement with a web surface. However, if the webs 51 or 52 should break or the end of the web be removed from the rolls 51 or 52, the arm 204 would drop thereby closing the electric circuit through the mercury tube 203. Closing of the electric circuit through the mercury tube 203 will energize a relay 205 to thereby open the main circuit switch 206 to the motor 10 of the machine, whereby the machine will stop until the web has been repaired.

A safety control 210 (see Figure 8) is provided to indicate whether a slack loop 61 in the web 51 has become too long or too short, or to indicate a breakage of the web between the drum 28 and the feed rolls 35 and 36. The control 210 is mounted upon the shaft 65 which is rotated by means of the arm 63 and the roll 64, which roll is in engagement with the slack loop 61. The control 210 consists of a mercury tube 211 mounted on an arm 212 which is pivoted at 213. The arm 211 rests upon an arm 214 secured to the shaft 65 and which is adapted to tilt the arm 212 to cause the mercury tube 211 to close circuit to the relay 205 when the arm 63 raises to a degree indicating too short a slack loop 61 or falls to a degree indicating too long a slack loop 61. The control 210 will thus stop the machine until the fault is remedied.

The control 210 will also indicate a web breakage of the paper web 51 between the feed rolls 35, 36 and the drum 28, since a breakage of the web 51 will produce a long slack loop 61, it being understood that the web 51 is not engaged between any friction rolls between the feed rolls 35, 36 and the drum 28, but is merely loosely carried upon supporting rolls.

While the operation of the collating, interleaving and gluing machine may be understood from the foregoing description, yet a resume of the function is believed desirable. To initiate operation of the machine, the desired number of rolls of paper webs and carbon webs 51 and 52 are positioned upon the respective supporting shafts 51a and 56. The paper webs have previously been printed with the desired form appearing upon the face thereof in successive order. The file holes, to be provided for each of the forms after being separated from the web, have also been provided in a marginal edge of the paper webs. The paper web rolls 51 are arranged along one side of the machine, as indicated in Figure 6, while the carbon web rolls are arranged along the opposite side of the machine, the rolls being arranged in vertical banks. The paper and carbon webs 51 and 52 respectively are manually threaded over the direction changing rods 54 and 55 respectively. As indicated in Figure 6, the paper and carbon webs 51 and 52 enter the machine in pairs and are fed through the machine in their interleaved relation.

Each pair of paper and carbon webs are then threaded through the feed rolls 35, 36 and are provided with the desired slack loop 61 in the paper web 51 and the slack loop 59 in the carbon web 52. The slack loop of the paper web is threaded around the roller 64, the position of which operates the control devices 66 and 210. The paper and carbon webs 51 and 52 are then threaded longitudinally through the machine in pairs over supporting rolls 60 and 86 (see Figure 5).

The manual threading of the machine provides the proper interleaving of the carbon webs 52 between the paper webs 51. Also the carbon web 52 can be manually adjusted to roughly pre-align the web with respect the paper web 51 by means of its position upon the direction changing rod 55, which rough alignment is accomplished prior to the entrance of the paper and carbon webs into the feeding rolls 35 and 36.

The plurality of interleaved paper and carbon webs 51 and 52 are then threaded between the guide brackets 94a of the aligning and gluing portion of the machine (see Figures 1 and 9). Upon threading the paper and carbon webs 51 and 52 through the aligning and gluing portion of the machine the webs are separated and individually threaded over their aligning rolls. The paper webs 51 are threaded between the guide brackets 94a and over their aligning rolls 89 and between the aligning collars 90. The carbon webs are threaded over their aligning rolls 89a and between the collars 90a, and also through the guide bracket 91. As heretofore mentioned the paper and carbon webs are separated upon entering the gluing and aligning portion of the machine, the paper web passing over the adhesive applying device 40 and in engagement with the adhesive applying disks 94 and 95, while the carbon web passes under the adhesive applying device 40.

The paper webs are then brought into engagement with the cylinder 74 of the drum 28 and the file holes 71, in the marginal edge of the paper webs, are brought into engagement with the aligning pins 85 mounted upon the drum 28. The successive paper webs are brought into proper register by aligning the file holes provided in the marginal edge of the web.

Also, while aligning the successive paper webs and bringing them into proper register upon the pins 85, the carbon webs which are interleaved in the threading manipulation are adjusted transversely with respect the to paper webs 51 to provide the proper marginal distance between the edges of the paper and carbon webs 51 and 52 respectively, the edge of the carbon web being arranged inside of the file holes in the paper webs 51.

The collars 90 upon the rollers 89 can be manually adjusted to maintain the proper alignment of the file holes with respect the aligning pegs 85 so that the paper webs 51 will not have a tendency to run off the drum 28. Also, the collars 90a on the rollers 89a and the guide bracket 91 can be adjusted to change the transverse alignment of the carbon web with the paper web and to maintain the adjustment after being once obtained.

The adhesive applying device 40 is shiftable upon its supporting rods 92 and 93a so that the adhesive applying disks 94 and 95 can be shifted to permit the wheels to straddle the file holes 71 in the paper web 51, whereby the continuous lines of adhesive are applied on either side of the file holes 71.

As heretofore mentioned, the paper webs 51 and the carbon webs 52, after having been separated through the aligning and adhesive applying steps are brought together upon the cylinder 74 of the drum 28, the alignment and proper register of adjacent webs being maintained. When the webs are brought into engagement with each other upon the drum 28 the carbon web will be caused to adhere to the innermost line of adhesive, while the adjacent paper webs 51 will be caused to adhere together by the outermost continuous line of adhesive.

The pins 85 upon the cylinder 74 of the drum 28 pull the webs through the gluing and aligning portion of the machine and from the collating portion thereof and discharge the adhering web stack into the cut-off device. Suitable guide brackets 225 are provided to direct the passage of the web stack from the drum into the cut-off device.

It is to be understood that during the threading of the machine the stop roll of the cut-off device has been properly adjusted to synchronise with movement of the web stack through the cut-off device 112 with the cut-off knife 24. The drum 28 continuously feeds the web stack through the cut-off device 112 which periodically severs the web stack into multiple copy form pads.

Any of the adjustments heretofore mentioned within the general description for the machine can be made to obtain the proper linear speed of travel of the web stack through the machine to obtain the desired width multiple copy pad, the adjustments having been made prior to the general functioning of the machine, and do not enter into the general function after the adjustments have been set.

Figure 32:
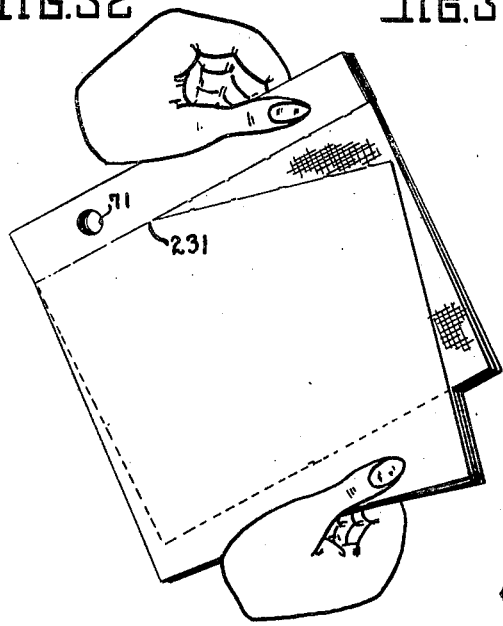
Figure 32 is an elevational perspective view showing the manner in which the interleaved sheets of carbon and paper of the product manufactured according to Figure 30 can be separated.
Figure 33:
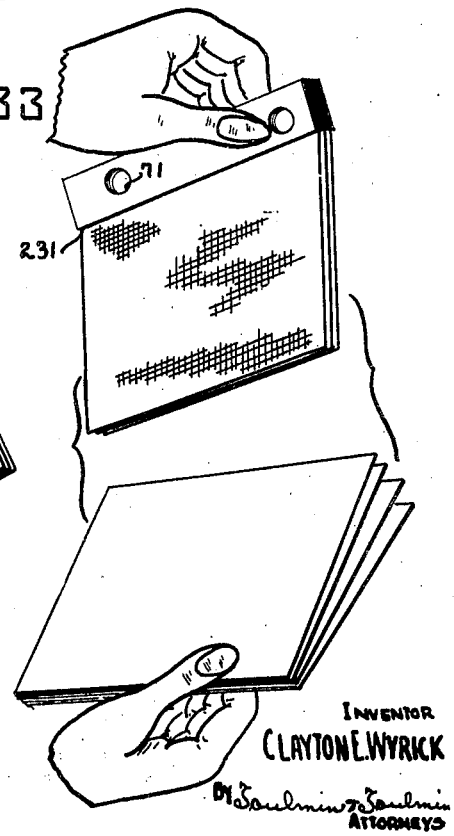
Figure 33 is an elevational perspective view of the completion of the separation of the interleaved sheets of carbon and paper.

The operation of the machine will produce a form of any desired width or length having a multiplicity of copies which are interleaved with carbon, as shown in Figures 30 to 33 inclusive. The glue lines are arranged as previously indicated, the glue line 91a being positioned below the file hole 71, while the glue line 92a is positioned above the file hole 71. The carbon interleaved between the paper will be retained upon the under side of the paper by means of the glue line 91a, while the successive sheets of paper will be retained together by the glue line 92a. The carbon sheets are preferably shorter than the paper sheets, as indicated at 230 (see Figure 30). Also, the sheets, forming the multiple copy pad, can be perforated along the top edge thereof, as indicated at 231. This arrangement permits an operator to grasp all of the paper sheets along their lower edges and tear the sheets from the carbon, as indicated in Figures 32 and 33, the sheets being severed along the tear-off line, or perforated line, 231.

It is to be understood that it is not a necessity to the functioning of the machine or the production of the product, as indicated in Figures 30 to 33, that adjacent carbon and paper sheets be of uniform size. In other words, a short paper and carbon sheet can be interleaved before long paper and carbon sheets, the only requirement being that the narrow paper and carbon sheets be aligned properly in the margin by means of their respective alignment rollers 89 or 89a.

Having thus fully described my invention, what I claim as new and desire to secure by Letters Patent, is:

1. In a machine for collating and interleaving a plurality of paper and carbon webs adapted to be fed into the machine transversely thereof, means for initially transversely aligning carbon and paper webs in adjacent paired relation and for changing the direction of movement of said webs from transverse to longitudinal of the machine, a common feeding means for continuously feeding a pair of said webs in said adjacent relation, means for separating said webs and for establishing positive transverse alignment thereof, means for applying adhesive along a margin of some of said webs while separated, means for withdrawing the web stack in interleaved relation from said machine and causing adherence of said webs to each other, and means for cutting the web stack at regular intervals.

2. In a machine for continuously collating and interleaving a plurality of paper and carbon webs, means for arranging carbon and paper webs in interleaved relation, means for continuously feeding said webs in said interleaved relation, means for applying adhesive along a margin of said webs, means for withdrawing said interleaved web stack from said machine and causing adherence of said webs to each other, means for controlling the rate of feed of said feeding means in response to the rate of withdrawal by said withdrawing means, means for cutting the web stack at regular intervals, and means actuated by a failure of web to enter said feeding means for stopping operation of the machine.

3. In a machine for collating and interleaving a plurality of paper and carbon webs, means for arranging carbon and paper webs in interleaved relation, means for continuously feeding said webs in said interleaved relation, means for separating said webs, means for applying adhesive along a margin of some of said webs while separated, means for aligning the carbon webs with respect the paper webs while separated and while applying the adhesive, cylinder means for collecting and withdrawing said interleaved web stack from said separating and adhesive applying means, said web stack passing over a substantial arc of said cylinder means for causing adherence of said webs to each other, and means for cutting the web stack at regular intervals.

4. In a machine for collating and interleaving a plurality of paper and carbon webs adapted to be fed into the machine transversely thereof, means for initially transversely aligning carbon and paper webs in adjacent paired relation and for changing the direction of movement of said webs from transverse to longitudinal of the machine, a common feeding means for continuously feeding a pair of said webs in said relation, means for separating said webs and for establishing positive transverse alignment thereof, means for applying a pair of continuous lines of adhesive along the under side of each of the paper webs marginally spaced from the edge thereof, means for aligning said carbon web with respect to said paper web while separated and while applying said adhesive to provide a margin between the edges of said webs, cylinder means for collecting and withdrawing said interleaved web stack from said separating and adhesive applying means and causing adherence of said webs to each other, means on said cylinder means providing the sole means for longitudinally aligning the paper webs with respect to each other, and means for cutting the web stack at regular intervals.

5. In a machine for collating and interleaving a plurality of paper and carbon webs adapted to be fed into the machine transversely thereof, means for initially transversely aligning carbon and paper webs in adjacent paired relation and for changing the direction of movement of said webs from transverse to longitudinal of the machine, a common feeding means for continuously feeding a pair of said webs in said relation, means for separating said webs and for establishing positive transverse alignment thereof, means for applying a pair of continuous lines of adhesive along the underside of each of the paper webs marginally spaced from the edge thereof, means for aligning said carbon web with respect to said paper web while separated and while applying said adhesive to provide a margin between the edges of said webs, cylinder means for collecting and withdrawing said interleaved web stack from said separating and adhesive applying means and causing adherence of said webs to each other, said withdrawing means providing means for feeding said web stack through cut-off means to periodically sever same.

6. In a machine for collating and interleaving a plurality of paper and carbon webs, means for arranging carbon and paper webs in interleaved relation, means for continuously feeding each of said paper and carbon webs, means for individually driving each of said feeding means, means for withdrawing said interleaved paper and carbon webs from the machine, means for simultaneously varying the speed of said feeding means and said withdrawing means in a constant ratio, and means for severing the web at regular intervals, said severing means maintaining a uniform cutting speed whereby the varied length of web fed by said feeding means is severed in different and predetermined increments to produce a different length of cut-off sheet.

7. In a machine for collating and interleaving a plurality of paper and carbon webs adapted to be fed into the machine transversely thereof, said paper webs having printed form faces and file holes in a marginal edge adjacent each form face, means for initially transversely aligning carbon and paper webs in adjacent paired relation and for changing the direction of movement of said webs from transverse to longitudinal of the machine, a common feeding means for continuously feeding a pair of said webs in said adjacent relation, means for separating said webs, means for applying a pair of continuous lines of adhesive along the under side of each of the paper webs marginally spaced from the edge thereof, means for transversely aligning said carbon web with respect said paper web while separated therefrom to cause said carbon web to align with one of said lines of adhesive, means to transversely align said paper webs while separated to cause the marginal edges thereof to be secured by the other adhesive line, cylinder means for collecting said webs and feeding same forwardly of the machine, said webs passing over a substantial arc of said cylinder means which has means extending therefrom into engagement with said file holes to longitudinally align each of said paper webs to cause successive sheets to adhere and be arranged in proper register when passing thereover.

8. In a machine for collating and interleaving a plurality of paper and carbon webs, means for arranging carbon and paper webs in interleaved relation, means for continuously feeding said webs in said interleaved relation, means for continuously withdrawing said webs in proper longitudinal register, means for intermittently stopping and cutting the web stack, means for driving said withdrawing means said feeding means and said cutting means in a determined speed ratio, means for changing the peripherial speed of said withdrawing means whereby to pull a different length of web from the machine to be cut by said cutting means, and means for changing the speed of said feeding means to match the changed peripherial speed of said withdrawing means.

9. In a machine for collating a plurality of paper webs, means for continuously feeding said webs, means for collating said webs, means for continuously withdrawing said collated webs, means for cutting off the web stack at periodic intervals, means for driving said feeding means and said withdrawal means in a given speed ratio to transmit said webs through the machine at a certain linear speed, means for driving said cut-off means at a constant periodic rate to thereby obtain a given length cut-off sheet, and means to change the linear speed of said withdrawal means to change the length of the cut-off sheet, and means to regulate the speed of the feeding means to compensate for the changed peripherial speed of said withdrawal means.

10. In a machine for collating a plurality of paper webs, means for continuously feeding said webs, means for collating said webs, means for continuously withdrawing said collated webs comprising an expansible drum, means for cutting off the web stack at periodic intervals, means for driving said feeding means and said withdrawal means in a given speed ratio to transmit said webs through the machine at a certain linear speed, means for driving said cut-off means at a constant periodic rate to thereby obtain a given length cut-off sheet, means to change the circumference of the drum to change the linear speed of the webs to change the length of the cut-off sheets, means to change the speed of said drum to change the length of the cut-off sheets, and means to adjust the speed of the feeding means to compensate for any change of peripherial speed of the drum.

11. In a machine for collating and interleaving a plurality of paper and carbon webs, said paper webs having printed form faces and having file holes in a marginal edge adjacent each form face, means for arranging said carbon and paper webs in interleaved relation, means for continuously feeding said webs in said interleaved relation, means for withdrawing said interleaved web stack from said machine, said withdrawing means comprising a rotating drum having a plurality of extending pins for engagement with said file holes to align said paper webs longitudinally in proper register, means for applying a pair of continuous lines of adhesive along the under side of each of the paper webs marginally spaced from the edge thereof, means for transversely aligning said carbon web with respect said paper web to cause said carbon web to align with one of said lines of adhesive, said withdrawing means simultaneously withdrawing said webs from the machine and causing adherence therebetween, and cut-off means receiving web as fed thereinto by said drum for cutting said web stack into individual forms.

12. In a machine for collating and interleaving a plurality of paper and carbon webs, said paper webs having printed form faces and having file holes in a marginal edge adjacent each form face, means for arranging said carbon and paper webs in interleaved relation, means for continuously feeding said webs in said interleaved relation, means for withdrawing said interleaved web stack from said machine, said withdrawing means comprising a rotating drum having a plurality of extending pins for engagement with said file holes to align said paper webs longitudinally in proper register, means for applying a pair of continuous lines of adhesive along the under side of each of the paper webs marginally spaced from the edge thereof, means for transversely aligning said carbon web with respect said paper web to cause said carbon web to align with one of said lines of adhesive, said withdrawing means simultaneously withdrawing said webs from the machine and causing adherence therebetween by rotating said web stack arcuately over said drum, and cut-off means receiving web as fed thereinto by said drum for cutting said web stack into individual forms.

13. In a machine for collating and interleaving a plurality of paper webs having periodically spaced holes in a marginal edge thereof, means for arranging the webs in interleaved relation, means for continuously feeding said webs in said interleaved relation, means transversely aligning adjacent webs, means for continuously withdrawing and longitudinally aligning said webs, cut-off means for periodically stopping and cutting said webs, said last mentioned means including a wheel rotatable by means of the advancement of the web toward a cut-off knife, a tooth extending from the edge of said wheel, means for stopping said tooth in a downward position adjacent said webs to engage said marginal holes and stop the forward advancement of said webs, and means to produce a cutting stroke of said knife while the webs are stopped.

14. In a machine for collating and interleaving a plurality of paper webs having periodically spaced holes in a marginal edge thereof, means for arranging the webs in interleaved relation, means for continuously feeding said webs in said interleaved relation, means transversely aligning adjacent webs, means for continuously withdrawing and longitudinally aligning said webs, cut-off means for periodically stopping and cutting said webs, said last mentioned means including a wheel rotatable by means of the advancement of the web toward a cut-off knife, a tooth extending from the edge of said wheel, means for stopping said tooth in a downward position adjacent said webs to engage said marginal holes and stop the forward advancement of said webs, and means to produce a cutting stroke of said knife while the webs are stopped, said means including means to release said wheel upon reaching the end of the cutting stroke.

15. In a machine for collating and interleaving a plurality of paper webs having periodically spaced holes in a marginal edge thereof, means for arranging the webs in interleaved relation, means for continuously feeding said webs in said interleaved relation, means transversely aligning adjacent webs, means for continuously withdrawing and longitudinally aligning said webs, cut-off means for periodically stopping and cutting said webs, said last mentioned means including a wheel rotatable by means of the advancement of the web toward a cut-off knife, a tooth extending from the edge of said wheel, means for stopping said tooth in a downward position adjacent said webs to engage said marginal holes and stop the forward advancement of said webs, means to produce a cutting stroke of said knife while the webs are stopped, said means including means to release said wheel upon reaching the end of the cutting stroke, and means to rapidly advance said webs upon release thereof to remove slack from said web stack gathered while stopped.

16. A machine for collating and interleaving a plurality of paper webs comprising in combination, means for arranging said webs in interleaved relation, means for continuously feeding said webs in said interleaved relation, means for applying a continuous line of adhesive a marginal distance inwardly of the edge, said means comprising a wheel arranged in contact with the web, means for providing positive rotation of said wheel at the peripherial speed of the web, means for withdrawing said interleaved web stack from said machine and causing adherence of said webs to each other, and means for cutting the web stack at regular intervals.

17. A machine for continuously collating and interleaving a plurality of paper and carbon webs comprising in combination, means for arranging carbon and paper webs in proper position for interleaving, means for continuously feeding said webs in said relation, means for bringing said webs into adjacent interleaved relation and for transversely aligning asid webs, means for applying a continuous adhesive line upon the under side of some of said webs while in aligned relation, means for continuously collecting and withdrawing said interleaved webs from said machine and maintaining the transverse alignment while aligning the webs longitudinally, said last mentioned means causing engagement of adjacent webs to cause same to adhere together, means for intermittently halting the webs as discharged by the withdrawing means, means for severing the webs while halted, and means to remove accumulated slack from said web between halt intervals.

18. A machine for collating and interleaving a plurality of paper and carbon webs comprising in combination, means for arranging carbon and paper webs in interleaved relation, means for continuously feeding said webs in said interleaved relation, means for continuously applying adhesive along a margin of said webs, means for continuously withdrawing said interleaved web stack from said machine and causing adherence of said webs to each other, means for intermittently halting the webs as discharged by the withdrawing means comprising means driven by the web movement for bringing stop means into periodic engagement with the webs for halting forward motion thereof, and means for severing the webs while halted.

19. A machine for collating and interleaving a plurality of paper and carbon webs comprising in combination, means for arranging carbon and paper webs in interleaved relation, means for continuously feeding said webs in said interleaved relation, means for continuously applying adhesive along a margin of said webs, means for continuously withdrawing said interleaved web stack from said machine and causing adherence of said webs to each other, means for intermittently halting the webs as discharged by the withdrawing means comprising means driven by the web movement for bringing stop means into periodic engagement with the webs for halting forward motion thereof, means for severing the webs while halted, and means for releasing the web driven halting means synchronised with operation of the severing means to release the halting means upon completion of the severing stroke of the severing means.

20. A machine for collating and interleaving a plurality of paper and carbon webs comprising in combination, means for arranging carbon and paper webs in interleaved relation, means for continuously feeding said webs in said interleaved relation, means for continuously applying adhesive along a margin of said webs, means for continuously withdrawing said interleaved web stack from said machine and causing adherence of said webs to each other, means for intermittently halting the webs as discharged by the withdrawing means comprising means driven by the web movement for bringing stop means into periodic engagement with the webs for halting forward motion thereof, means for severing the webs while halted, means for releasing the web driven halting means synchronised with operation of the severing means to release the halting means upon completion of the severing stroke of the severing means, and means for increasing the speed of travel of the web through the halting means above normal upon release of the halting means until slack accumulated in the web in advance of the halting means is removed.

21. A machine for collating and interleaving a plurality of paper and carbon webs comprising in combination, means for arranging carbon and paper webs in interleaved relation, means for continuously feeding said webs in said interleaved relation, means for continuously applying adhesive along a margin of said webs, means for continuously withdrawing said interleaved web stack from said machine and causing adherence of said webs to each other, means for intermittently halting the webs as discharged by the withdrawing means comprising means driven by the web movement for bringing stop means into periodic engagement with the webs for halting forward motion thereof, means for severing the webs while halted, means for releasing the halting means synchronised with operation of the severing means to release the halting means upon completion of the severing stroke of the severing means, and means having a surface speed greater than the normal web speed for increasing the speed of travel of the web through the halting means above normal upon release of the halting means until slack accumulated in the web in advance of the halting means is removed.

22. A method for collating paper and carbon webs comprising, the step (a) of manually establishing longitudinal register of adjacent paper webs, the step (b) of establishing initial transverse alignment of an adjacent pair of paper and carbon webs by changing the direction of movement of the webs, the step (c) of continuously feeding said webs in pairs, the step (d) of applying continuous lines of adhesive upon the paper webs, the step (e) of accurately aligning the paper and carbon webs transversely, and the step (f) of continuously withdrawing said webs and longitudinally aligning the same as fed and causing adherence therebetween.

23. A method for collating paper and carbon webs comprising, the step (a) of manually establishing longitudinal register of adjacent paper webs, the step (b) of establishing initial transverse alignment of an adjacent pair of paper and carbon webs, the step (c) of continuously feeding said webs in pairs, the step (d) of separating the pairs of webs and aligning the same transversely while separated, the step (e) applying continuous lines of adhesive upon the paper webs while separated and in process of alignment, the step (f) of bringing the separated pairs of webs into adjacent surface engagement to cause adherence while in transverse alignment, and the step (g) of continuously withdrawing said webs as fed while maintaining the established longitudinal register.

24. A method for collating paper and carbon webs comprising, the step (a) of establishing longitudinal register of adjacent paper webs, the step (b) of establishing initial transverse alignment of an adjacent pair of paper and carbon webs, the step (c) of continuously feeding said webs in pairs, the step (d) of applying continuous lines of adhesive upon the paper webs, the step (e) of accurately aligning the paper and carbon webs transversely, and the step (f) of continuously withdrawing said webs as fed while maintaining the established longitudinal register and concomitantly bringing the separated pairs of webs into adjacent surface engagement over an arcuate surface to cause adherence while in transverse alignment.

25. In a collating machine, friction means for feeding a plurality of webs, positive driven means for withdrawing the webs from the machine, means for maintaining substantial synchronism of speed of operation of said first two mentioned means, means for changing the speed of withdrawal of the webs, and means for actuating said friction feed means for re-establishing said speed synchronism of operation.

26. In a collating machine, means for feeding a plurality of webs, means for withdrawing the webs from the machine comprising changeable means having different diameters to alter the peripheral speed of the webs, means for maintaining substantial synchronism of speed of operation of said first two mentioned means, a second means for changing the peripheral speed of operation of the withdrawing means, and means for re-establishing said speed synchronism of operation.

27. In a collating machine, means for feeding a plurality of webs, means for withdrawing the webs from the machine, means for maintaining substantial synchronism of speed of operation of said first two mentioned means, means operated at constant speed for severing the webs in regular increments, means for changing the speed of withdrawal of the webs in predetermined steps, and means for re-establishing said synchronism of operation at said changed withdrawal speed, said severing means continuing constant speed operation to sever said webs at a different and predetermined increment.

28. In a collating machine, means for feeding a plurality of webs, means for withdrawing the webs from the machine comprising means having a changeable peripherial speed, automatic means for maintaining the operation of the feeding means in substantial synchronism with the operation of the withdrawing means, means for changing the peripherial speed of operation of the withdrawing means, and means for changing the speed of operation of said feeding means to re-synchronize the same with the withdrawing means without altering the effective functioning of the automatic synchronizing means.

29. In a paper handling machine, means for feeding paper through said machine, means for severing said paper in increments the total length of a predetermined number of which bears a predetermined ratio to the movement of the feeding means so that when the predetermined number of increments have been severed the feeding means is always in a predetermined position, and means for changing the speed ratio between the feeding means and the severing means, said last mentioned means providing means to predetermine the number of sheets severed with respect to a predetermined movement of the feeding means.

30. In a paper handling machine, a rotatable drum for feeding a paper web through said machine, means for severing said web in increments the total length of a predetermined number of which equals the circumference of the drum, and means for changing the speed ratio between the drum and said severing means, said last mentioned means providing means for controlling the rotation of said drum to predetermine the total number of sheets severed from said web for each revolution of said drum.

31. In a paper handling machine, a rotatable drum for feeding a paper web through said machine, means for severing said web in increments the total length of a predetermined number of which equals the circumference of the drum, changeable means for altering the circumference of the drum, and a step transmission for changing the speed ration between the drum and said severing means to predetermine the number and the width of the sheets severed from the web for each revolution of said drum, said drum circumference providing control over the width of sheet severed from the web intermediate the widths controlled by the step transmission.

32. In a paper handling machine, means for feeding a paper web through the machine including drum means adapted to be changed upon the machine when a drum of different diameter is required to change the speed of movement of the web through the machine, means for severing the web in increments the total length of a predetermined number of which equals the circumference of the drum, and means for changing the speed ratio between said drum and said severing means in predetermined steps, said last mentioned means determining the number of sheets severed from the web for each revolution of said drum, the circumference of said drum determining the linear speed of the web passing the severing means and controlling the width of the individual sheets severed per revolution of said drum.

CLAYTON E. WYRICK.